US010764424B2

(12) United States Patent
Lim et al.

(10) Patent No.: US 10,764,424 B2
(45) Date of Patent: Sep. 1, 2020

(54) INTELLIGENT DIGITAL ASSISTANT ALARM SYSTEM FOR APPLICATION COLLABORATION WITH NOTIFICATION PRESENTATION

(71) Applicant: Microsoft Technology Licensing, LLC, Redmond, WA (US)

(72) Inventors: Melissa Lim, Seattle, WA (US); Anthony Hugh, Seattle, WA (US); Wenyu Lu, Redmond, WA (US); Yuri Dogandjiev, Seattle, WA (US); Haronid Moncivais, Kirkland, WA (US); Chris O'Connor, Seattle, WA (US); Christian Colando, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 14/561,916

(22) Filed: Dec. 5, 2014

(65) Prior Publication Data
US 2016/0165038 A1 Jun. 9, 2016

(51) Int. Cl.
*H04M 1/725* (2006.01)
*G06Q 10/10* (2012.01)
*H04W 4/029* (2018.01)

(52) U.S. Cl.
CPC ...... *H04M 1/72566* (2013.01); *G06Q 10/109* (2013.01); *H04M 1/72569* (2013.01);
(Continued)

(58) Field of Classification Search
None
See application file for complete search history.

(56) References Cited

U.S. PATENT DOCUMENTS 4,585,358 A * 4/1986 Shay ...................... G04B 23/03
368/262
5,987,415 A 11/1999 Breese et al.
(Continued)

FOREIGN PATENT DOCUMENTS

CN 102742255 A 10/2012
CN 102769691 A 11/2012
(Continued)

OTHER PUBLICATIONS

Kleek, et al., "Atomate It! End-user Context-Sensitive Automation using Heterogeneous Information Sources on the Web", In Proceedings of the 19th International Conference on World Wide Web, Apr. 26, 2010, 10 pages.
(Continued)

*Primary Examiner* — Cesar B Paula
*Assistant Examiner* — John M Heffington
(74) *Attorney, Agent, or Firm* — NovoTechIP International PLLC

(57) ABSTRACT

A digital assistant supported on devices such as smartphones, tablets, personal computers, game consoles, etc. exposes an updated and enhanced set of alarm functions to improve a device's user wake-up routines by applying automation rules to a variety of collected or sensed data and inputs in a context-aware manner in order to surface user experiences and content that are contextually meaningful and catered to the particular device user. The digital assistant can support an alarm system having network connectivity to other devices and external systems that enables the user to set an alarm and be awoken using a wide variety of stimuli such as sounds, voice, music, lights, and tactile sensations and then be given a summary of the upcoming day using verbal narration and graphical displays on the device.

20 Claims, 21 Drawing Sheets

(52) U.S. Cl.
CPC .... *H04M 1/72533* (2013.01); *H04M 1/72547* (2013.01); *H04M 1/72572* (2013.01); *H04M 2250/74* (2013.01); *H04W 4/029* (2018.02)

(56) References Cited

U.S. PATENT DOCUMENTS

| | | | |
|---|---|---|---|
| 6,209,011 B1* | 3/2001 | Vong | G04G 11/00 708/112 |
| 6,757,362 B1 | 6/2004 | Cooper et al. | |
| 7,720,784 B1 | 5/2010 | Froloff | |
| 8,132,229 B2 | 3/2012 | Garbow et al. | |
| 8,195,194 B1 | 6/2012 | Tseng | |
| 8,204,749 B2 | 6/2012 | Hakkani-Tur et al. | |
| 8,230,075 B1 | 7/2012 | Weskamp et al. | |
| 8,458,102 B2 | 6/2013 | Bill | |
| 8,677,377 B2 | 3/2014 | Cheyer et al. | |
| 8,698,727 B2 | 4/2014 | Herz et al. | |
| 8,700,009 B2 | 4/2014 | Quy | |
| 8,704,068 B2 | 4/2014 | Bowen | |
| 8,704,760 B2 | 4/2014 | Kang et al. | |
| 8,782,122 B1 | 7/2014 | Chang | |
| 2004/0082839 A1 | 4/2004 | Haugen | |
| 2006/0026499 A1* | 2/2006 | Weddle | G06F 17/246 715/213 |
| 2007/0043687 A1 | 2/2007 | Bodart et al. | |
| 2007/0161402 A1 | 7/2007 | Ng et al. | |
| 2008/0096533 A1 | 4/2008 | Manfredi et al. | |
| 2008/0235284 A1 | 9/2008 | Aarts et al. | |
| 2009/0002178 A1 | 1/2009 | Guday et al. | |
| 2009/0052864 A1* | 2/2009 | Ohde | H04N 5/44543 386/298 |
| 2009/0077203 A1* | 3/2009 | Janik | G04G 11/00 709/219 |
| 2009/0113346 A1 | 4/2009 | Wickramasuriya et al. | |
| 2009/0292713 A1 | 11/2009 | Jung | |
| 2010/0134385 A1 | 6/2010 | Roth et al. | |
| 2011/0201960 A1 | 8/2011 | Price | |
| 2012/0016678 A1 | 1/2012 | Gruber et al. | |
| 2012/0142429 A1 | 6/2012 | Muller | |
| 2013/0132088 A1 | 5/2013 | Kim | |
| 2013/0152092 A1 | 6/2013 | Yadgar | |
| 2013/0159274 A1* | 6/2013 | Silberstein | H04L 67/20 707/706 |
| 2013/0159377 A1* | 6/2013 | Nash | H04L 67/00 709/202 |
| 2013/0198694 A1* | 8/2013 | Rahman | G06F 3/0484 715/864 |
| 2013/0222232 A1 | 8/2013 | Kong et al. | |
| 2013/0338446 A1* | 12/2013 | Van Vugt | A61B 5/4806 600/300 |
| 2014/0089399 A1 | 3/2014 | Chun et al. | |
| 2014/0100835 A1 | 4/2014 | Majumdar et al. | |
| 2014/0232534 A1 | 8/2014 | Birnbaum et al. | |
| 2014/0253319 A1 | 9/2014 | Chang | |
| 2014/0298249 A1* | 10/2014 | Lee | G06F 3/0481 715/781 |
| 2015/0178822 A1* | 6/2015 | Babiarz | G06Q 30/00 705/26.7 |
| 2015/0207873 A1* | 7/2015 | Chang | H04L 67/1048 709/205 |
| 2016/0042620 A1* | 2/2016 | Dandie | G06F 21/12 340/568.3 |

FOREIGN PATENT DOCUMENTS

| | | | |
|---|---|---|---|
| CN | 103428339 A | | 12/2013 |
| CN | 103488384 A | | 1/2014 |
| CN | 102946491 B | | 11/2014 |
| JP | 2005190388 A | | 7/2005 |
| WO | 2007077534 A1 | | 7/2007 |
| WO | 2007096564 A2 | | 8/2007 |

OTHER PUBLICATIONS

"Emotion-Awareness: Do we need a 'Mood Graph'?", Retrieved on: Jul. 5, 2014, Available at: http://www.arguslabs.be/blog/emotion-awareness-mood-graph/, 9 pages.

"Your Car on iOs. Or Android. Or Linux", Retrieved on: Jul. 5, 2014, Available at: http://www.arguslabs.be/blog/week-context-20140307/, 9 pages.

Steinhart, Michael, "Voice Analytics: You Sound Emotional", Retrieved on: Jul. 5, 2014, Available at: http://www.allanalytics.com/author.asp?doc_id=272068, 6 pages.

Warren, Tom, "The story of Cipriano, Microsoft's Siri killer", Published on: Apr. 2, 2014, Available at: http://www.theverge.com/2014/4/2/5570866/cortana-windows-phone-8-1-digital-assistant, 8 pages.

Park, Madison, "Is this the world's first emo robot?", Published on: Jun. 6, 2014, Available at: http://edition.cnn.com/2014/06/06/world/asia/japan-robot-softbank/, 8 pages.

"International Search Report and the Written Opinion Issued in PCT Application No. PCT/US2015/063302", dated Feb. 16, 2016, (13 Pages total).

"International Preliminary Report on Patentability Issued in PCT Application No. PCT/US2015/063302", dated Feb. 20, 2017, 9 Pages.

"Second Written Opinion Issued in PCT Application No. PCT/US2015/063302", dated Nov. 3, 2016, 8 Pages.

Burns, M. N., Begale, M., Duffecy, J., Gergle, D., Karr, C. J., Giangrande, E., & Mohr, D. C. (Dec. 8, 2011). Harnessing Context Sensing to Develop a Mobile Intervention for Depression. Journal of Medical Internet Research, 13(3).doi:10.2196/jmir.1838 (18 pages total).

Gardner, D. (Feb. 9, 2012). Could a smartphone improve your mood? New mobile technology 'senses when you're depressed' and calls with a cure. Retrieved Aug. 2, 2016, from http://www.dailymail.co.uk/news/article-2099102/Mobilyze-The-phone-senses-you re-depressed-calls-cure.html (3 pages total).

Heussner, K. M. (Jul. 23, 2010). ToneCheck Scans Email for Emotions, Flags Loaded Phrases. Retrieved Aug. 3, 2016, from http://abcnews.go.com/T echnology/tonecheck-scans-emai l-emotions-flags-loaded-ph rases/story?id=11230739 (3 pages total).

ToneCheck. (Jul. 26, 2010). Retrieved Aug. 2, 2016, from http://www.tonecheck.com/ (2 pages total).

LiKamWa, R. (2012). MoodScope: Building a Mood Sensor from Smartphone Usage Patterns. Rice University. Retrieved Aug. 3, 2016, from https://scholarship.rice.edu/handle/1911/64654?show=full. (69 pages total).

Pearce, R. (Jun. 28, 2013). The next frontier of application context-awareness: Mood. Retrieved Aug. 2, 2016, from http://www.techworld.com.au/article/466164/next_frontier_application_context-awareness_mood (8 pages total).

LiKamWa, R., Liu, Y., Lane, N. D., & Zhong, L. (Nov. 1, 2011). Can Your Smartphone Infer Your Mood? In ACM Conference on Embedded Networked Sensor Systems 2011. Retrieved Aug. 3, 2016. (5 pages total).

MoodKit. (Jul. 17, 2011). Retrieved Aug. 3, 2016, from http://www.thriveport.com/products/moodkit/ (18 pages total).

"Office Action Issued in European Patent Application No. 15816977.1", dated Nov. 12, 2018, 11 Pages.

"Office Action and Search Report Issued in Chinese Patent Application No. 201580066203.3", dated Jun. 4, 2019, 23 Pages.

"Summons to Attend Oral Proceedings Issued in European Patent Application No. 15816977.1", Mailed Date: Oct. 4, 2019, 13 Pages.

"Second Office Action Issued in Chinese Patent Application No. 201580066203.3", dated Jan. 19, 2020, 10 Pages.

* cited by examiner

INTELLIGENT DIGITAL ASSISTANT ALARM SYSTEM FOR APPLICATION COLLABORATION WITH NOTIFICATION PRESENTATION

BACKGROUND

Computers and mobile devices such as smartphones and tablets provide a wide variety of functions and features that are beneficial to users and make it easier to perform tasks and get information. However, clock and alarm features on some of these existing devices are not much more comprehensive than what is provided on traditional alarm clocks and clock radios.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported on devices such as smartphones, tablets, personal computers (PCs), game consoles, etc. exposes an updated and enhanced set of alarm functions to improve a device's user wake-up routines by applying automation rules to a variety of collected or sensed data and inputs in a context-aware manner in order to surface user experiences and content that are contextually meaningful and catered to the particular device user. The digital assistant can support an alarm system having network connectivity to other devices and external systems that enables the user to set an alarm and be awoken using a wide variety of stimuli such as sounds, voice, music, lights, and tactile sensations, and then be given a summary of the upcoming day using verbal narration and graphical displays on the device. The summary provides information that is of interest to the user and which is contextually relevant to the day/time, location, the user's behaviors/mood, and/or what is happening in the user's day. So a summary may include information about the current weather and traffic conditions, news headlines, new texts, entertainment items such as jokes and trivia, notifications, messages received, reminders for upcoming tasks, and appointments in the user's calendar.

In addition to controlling sound, graphical display, and other user interfaces on the device on which it resides, the digital assistant alarm system can connect with other devices and external systems such as intelligent home devices/systems to control the user's environment as part of the alarm and wake-up experience. The system can change room ambience as needed to match a wide range of different wake-up scenarios. In one scenario, just the device display screen is very gradually turned up in brightness while dreamy jazz music softly plays in the background. In another scenario, bright room lights are suddenly turned on as rock music is played at a loud volume on a home sound system.

Once awake, as the user listens to or watches her catered summary, the digital assistant alarm system can interact with connected devices in the home to help start the user's day. Home appliances can be operated and the user's PC or other devices can be triggered to launch applications and navigate in advance to specific content and experiences that the user may need or want to use to begin her particular day. Thus, the digital assistant alarm system can take different actions to support different wake-up and summary experiences depending on whether the user is on vacation at a resort with a ski outing planned for the day or if the user is at home with a jam packed day at the office ahead. If the user is running behind schedule on a particular morning, the digital assistant alarm system may skip the jokes in the summary and instead interact with the user to postpone an upcoming appointment and start the user's car remotely to get it ready for the drive to work.

The digital assistant alarm system can be initially configured to employ user-selectable default behaviors and can also be adapted to learn a particular user's wake-up patterns and routines over time so that appropriately catered wake-up and summary experiences can be provided automatically. So if on weekdays the user routinely checks stock prices and the weather on her tablet device while waiting for the coffee to brew, the digital assistant alarm system can automatically read out the current stock and weather information and turn on the coffee maker as part of her catered wake-up experience. If on weekends, the user goes out for a run first thing in the morning—as evidenced by either the user's schedule maintained on a device or by motion sensor data (e.g., data captured by the device or a companion device such as wristband) that can indicate when she is running—the digital assistant alarm system can automatically begin playing up-tempo music before the run begins to get the user pumped up and ready to exercise.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

Figure 1:
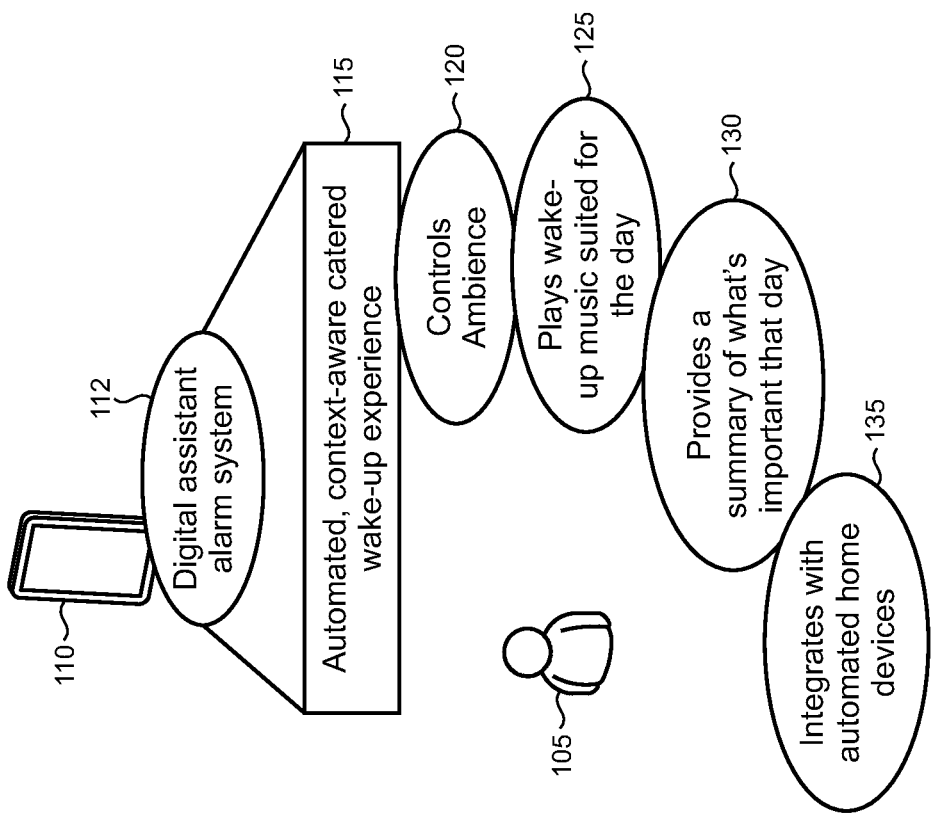
FIG. 1 shows illustrative features exposed by a digital assistant alarm system during an automated, catered wake-up experience.

Like reference numerals indicate like elements in the drawings. Elements are not drawn to scale unless otherwise indicated. It is emphasized that the particular UIs displayed in the drawings can vary from what is shown according to the needs of a particular implementation. While UIs are shown in portrait mode in the drawings, the present arrangement may also be implemented using a landscape mode.

DETAILED DESCRIPTION

FIG. 1 shows an overview of the kinds of features and functions that the present digital assistant alarm system 112 instantiated on a device 110 can expose as part of an automated, catered wake-up experience 115. As shown, the digital assistant alarm system 112 can control ambience 120, play wake-up music 125 (and/or other audio) that is suited for the user's particular day, provide a summary of what's important that day 130 (either verbally or graphically on the device display), and can integrate with automated home devices 135 in order to support a comprehensive and helpful wake-up experience for the device user 105.

Figure 2:
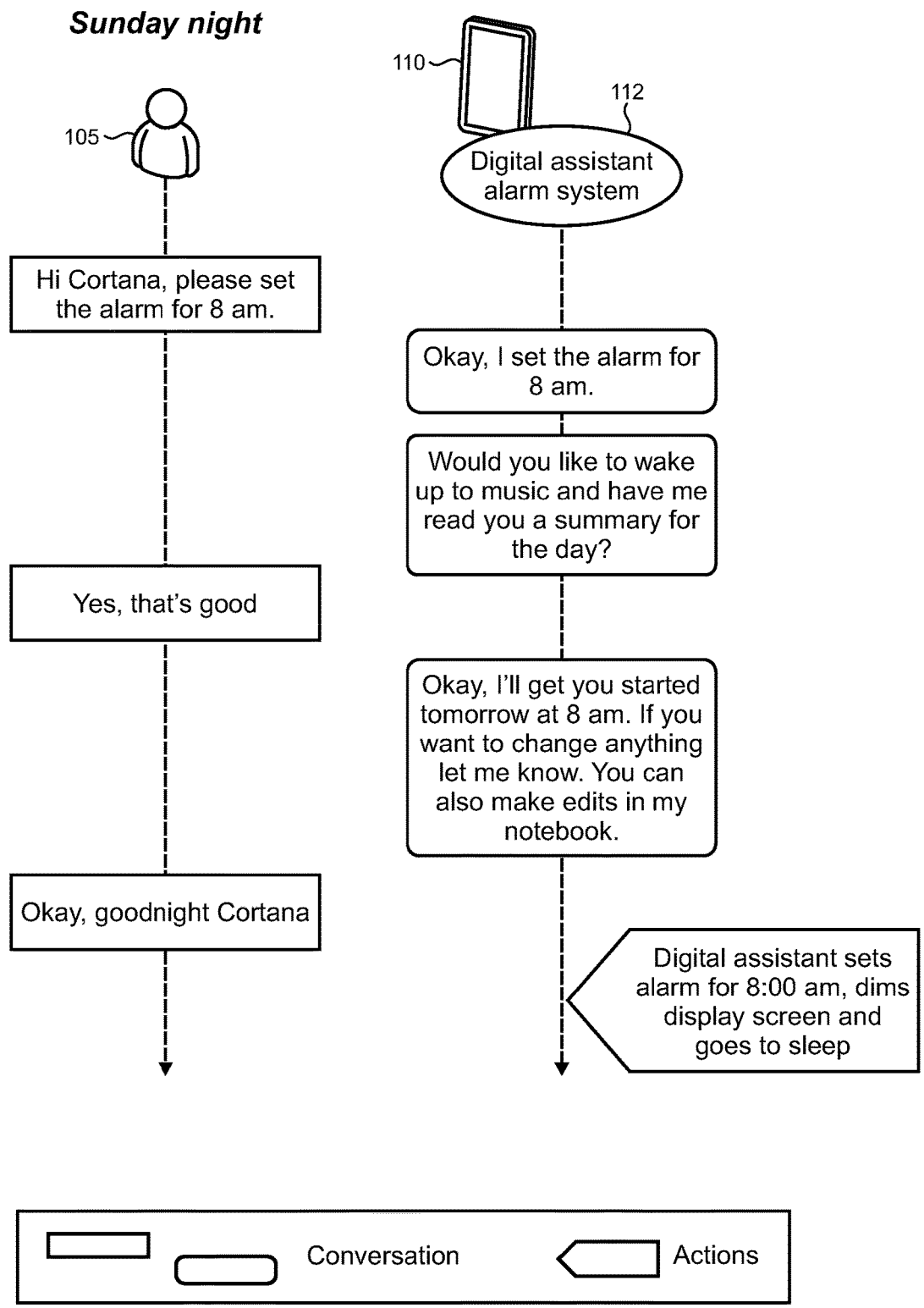
FIGS. 2, 2A, 2B, 2C, 2D, 2E, and 2F depict illustrative use scenarios involving a user and a digital assistant alarm system.

The digital assistant alarm system 112 can be utilized in a variety of scenarios, several of which are now presented. A first illustrative use scenario is shown in FIG. 2 in which the user 105 interacts with the system 112 on a tablet device 110 and, using her voice with a natural language interface exposed by the digital assistant (named "Cortana" in this example), instructs an alarm to be set for the next morning. The digital assistant alarm system verbally responds to the instruction and confirms the user's desired wake-up routine.

Figure 2A:
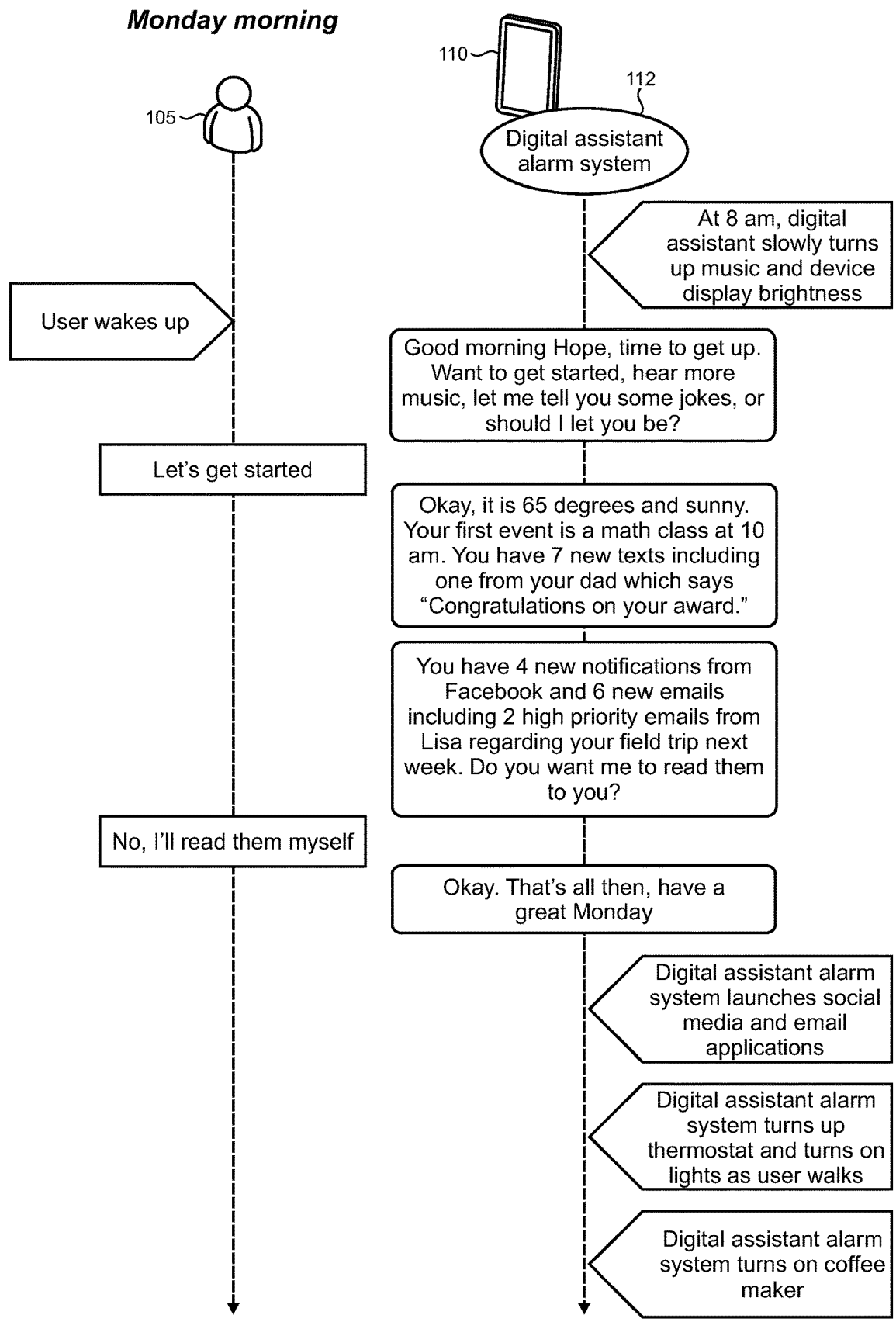
Figure 2B:
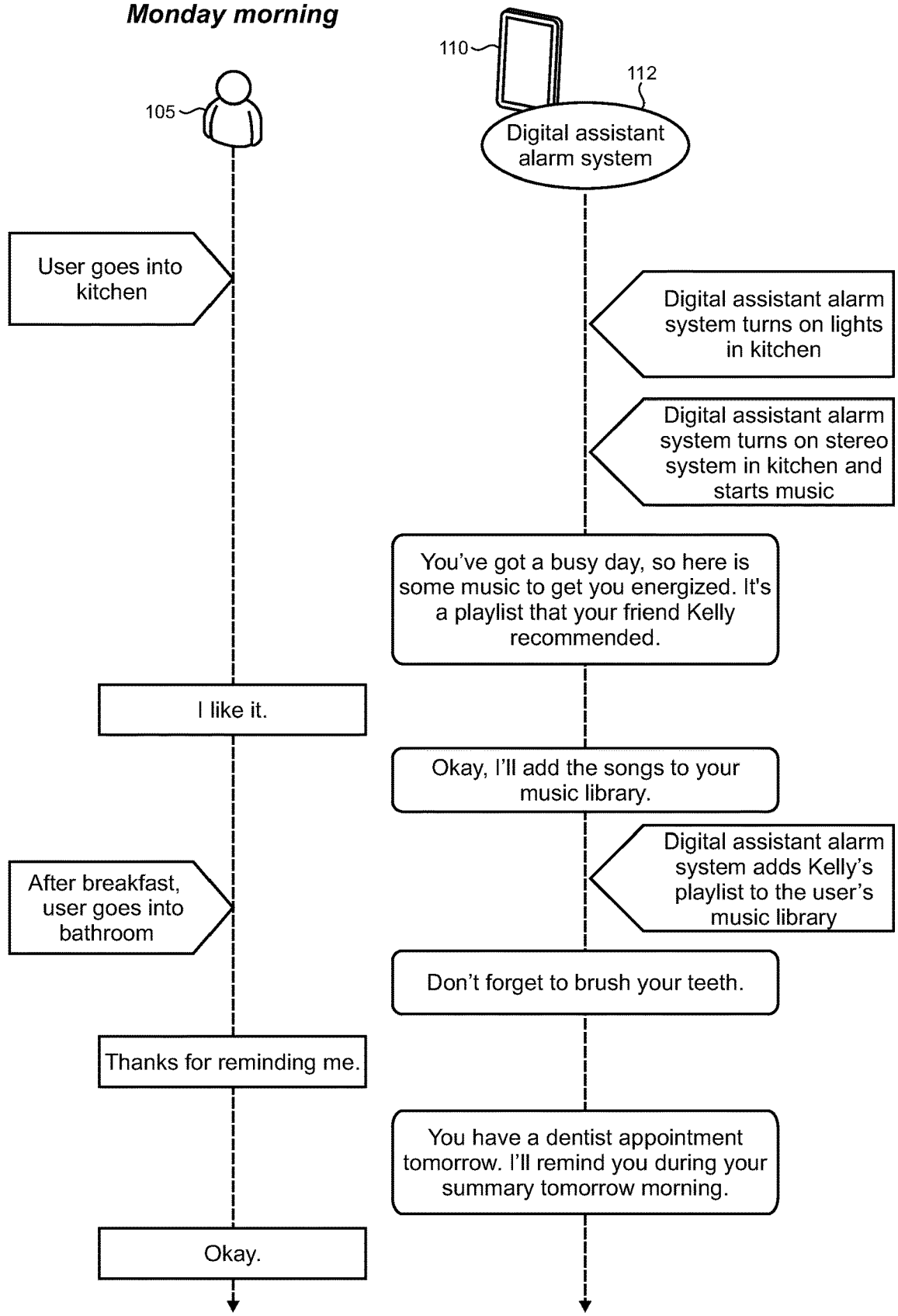
Figure 2C:
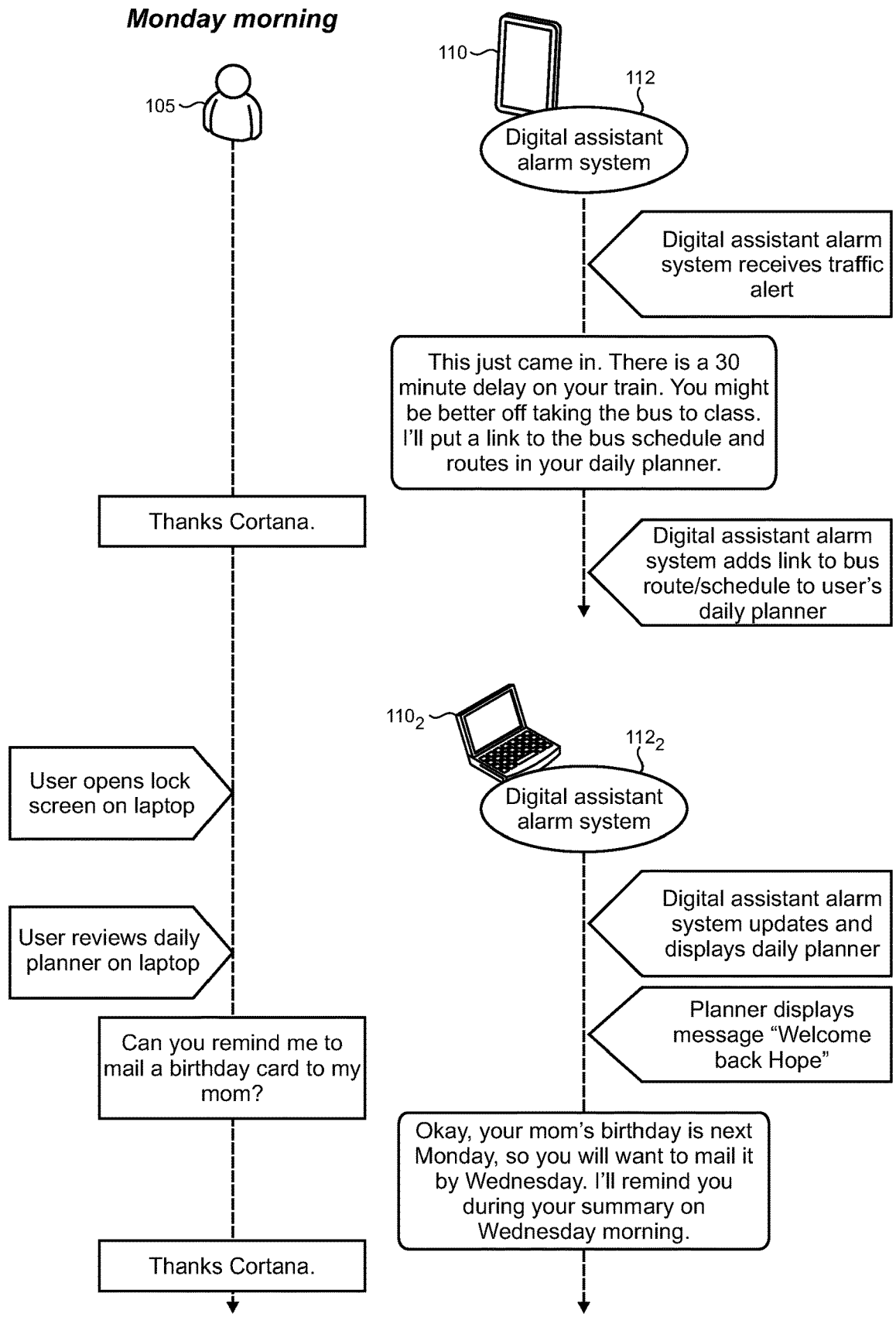

The next morning at the set alarm time, as shown in FIGS. 2A, 2B, and 2C the digital assistant alarm system 112 slowly turns up music to wake the user, initiates and carries on conversations with the user, and performs various tasks and actions to get the user's day started using contextual data such as the user's location, mood, and observed behaviors to cater the wake-experience to the particular user and make it helpful and beneficial. For example, if the user is determined to be in an upbeat mood and/or has a relaxed schedule that day, the digital assistant alarm system may start the day off by telling a few jokes. However, if the user has a busy or stressful day ahead (e.g., school exams, a big business presentation, etc.), the digital assistant alarm system may dispense with the jokes and instead help the user get prepared to meet the day's challenges by reviewing the day's schedule, remind the user to bring the appropriate materials, provide words of encouragement, and the like. The digital assistant can also employ different tones of voice depending on the user's mood.

The digital assistant alarm system can also work across the user's various devices so that wake-up experiences can be seamlessly supported, as shown in FIG. 2C, in which the user interacts with another instance of the digital assistant alarm system $112_2$ on a laptop PC $110_2$. For example, as shown, the user can pick up the interaction with the digital assistant alarm system on the PC to review her daily planner. In other examples (not shown), the user can switch from her tablet to read notifications on the PC using its larger display screen which may be more convenient. In typical implementations, each of the user's connected devices (for example, smartphones, tablets, PCs and wearable devices) can surface an alarm and be notified when the user wakes up.

Figure 2D:
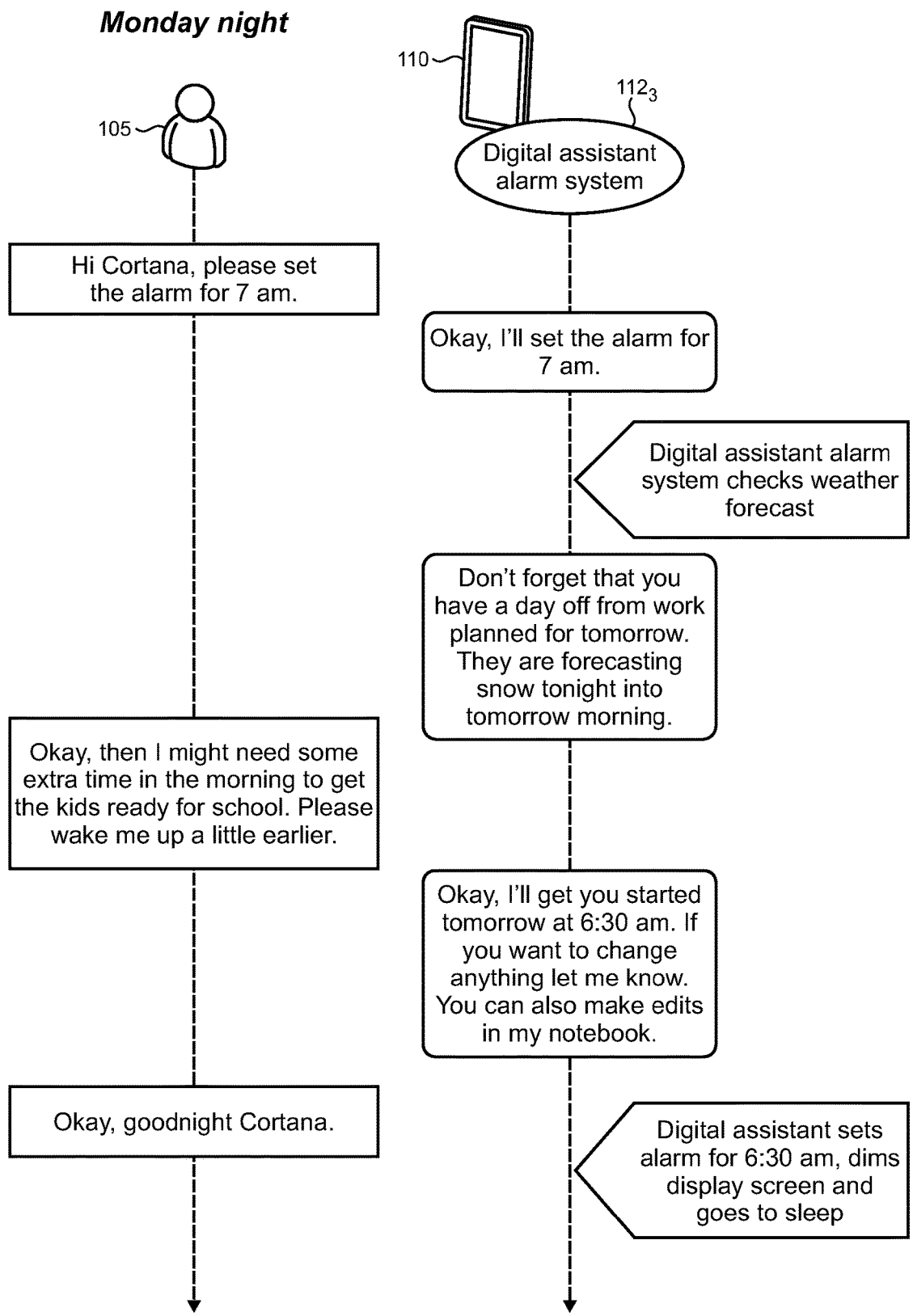
Figure 2E:
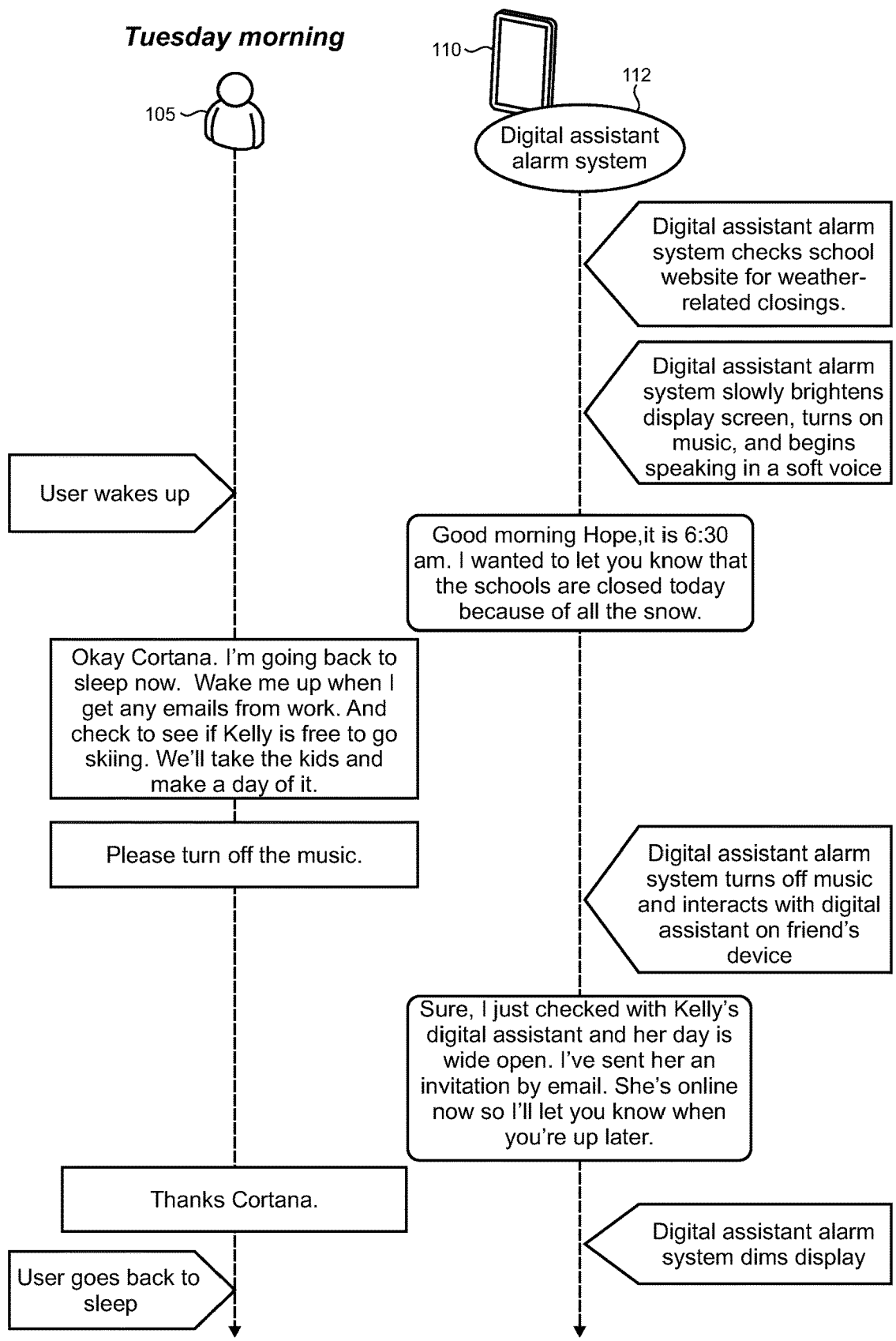
Figure 2F:
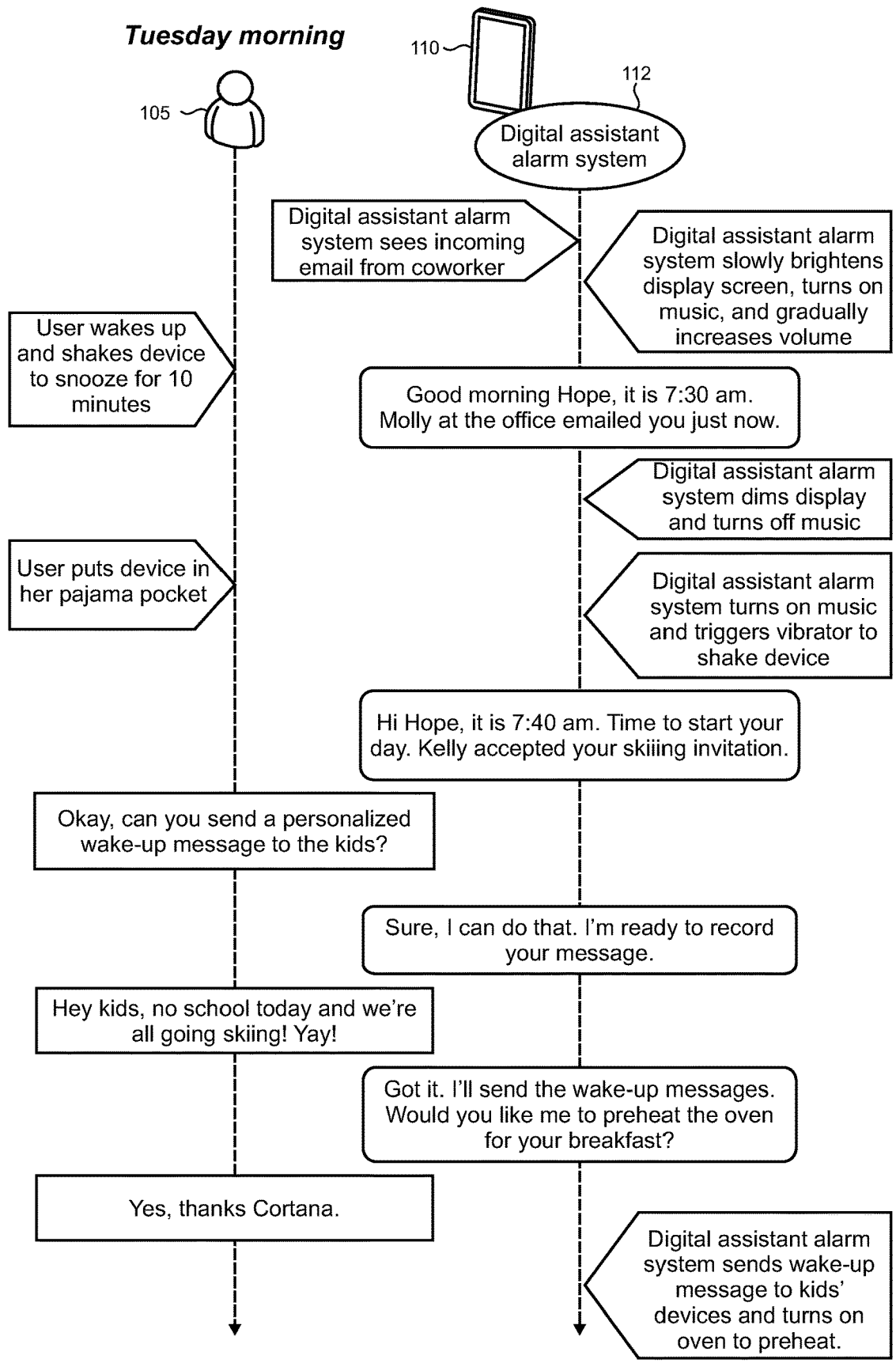

A second illustrative use scenario is shown in FIGS. 2D, 2E, and 2F. The digital assistant alarm system can learn from the user's past behaviors and routines to surface contextually relevant information. In this scenario, with the user's consent, the digital assistant alarm system 112 has observed in the past that the user 105 generally checks the weather forecast each night before going to bed. Accordingly, the digital assistant alarm system in this use scenario has checked and informed the user of the weather forecast as part of the user's bedtime routine when setting the alarm for the next morning. The digital assistant alarm system also uses contextual data retrieved from the user's electronic schedule (that is maintained on the device or a connected device) in order to surface a contextually relevant reminder about the upcoming day.

The next morning at the set alarm time as shown in FIG. 2E, the digital assistant alarm system knows from user input to a user profile and/or user behaviors that the user has school age children. Therefore, the digital assistant alarm system checks an external resource to get third party content prior to the alarm time to see if local schools are closed because of the weather. Alternatively, the device 110 may be registered to receive push notification from external resources to learn of events such as weather-related delays and closings. The digital assistant alarm system can also interact with counterpart systems on remote devices to retrieve information and complete tasks.

As shown in FIG. 2F, the digital assistant alarm system can take advantage of device sensors, such as motion sensors and environmental sensors (e.g., those that can sense ambient light, temperature, etc.) in order to know how to surface alarms and other information. The digital assistant alarm system can also enable a user to customize certain interactions such as provide special wake-up messages for other users and/or set alarms on other devices for other users. For example, a parent may set an alarm using a digital assistant alarm system on a device for a child and be notified when the child wakes up.

It is emphasized that the use scenarios above are intended to be illustrative and that a variety of tasks may be performed and actions taken by the digital assistant alarm system when supporting a catered wake-up routine. These include, for example, interacting with the user (which may involve the digital assistant asking clarifying questions, and/or following up with the user), performing various tasks, providing services, gathering information (e.g., by accessing a search service or interacting with remote resources such as web pages), establishing communications using voice, video, or messaging, operating the device and other network-connected devices and appliances, and performing various other functions to assist the user during a wake-up routine.

The digital assistant alarm system 112 can employ various heuristics, pattern recognition methods, learning-algorithms, and/or policies that take into account available inputs, contexts, and the user's behaviors and interactions when providing alarm and wake-up experiences. For example, if the user has established a history of using a particular sequence of applications or visiting a particular sequence of websites after waking, for example, then the digital assistant alarm system 112 can automatically set up those experiences on the user's devices to save time in the morning.

If the user typically checks the headlines on a news site after waking up, then the digital assistant alarm system can automatically scrape the headlines off the site and read them to the user as part of her summary. If the user has established a routine of watching television news with her morning coffee, then the digital assistant alarm system can turn on the television and tune to the correct channel while brewing the user's morning coffee. In some implementations, a user interface can be exposed that enables the user to fine tune the degree to which the digital assistant alarm system will use learning and pattern recognition when providing a catered experience. The user may also be enabled through the UI to override automatic behaviors of the digital assistant alarm system in some cases in which instances of user overrides can be included as part of the learned behavior of the digital assistant.

Advantageously, the present digital assistant alarm system enables the user's day to get off to an effective start in a way that provides comprehensive features and wake-up user experiences while simultaneously controlling the technologies in the user environment such as network-connected appliances and devices in a manner that optimizes utilization and allocation of computing resources and network bandwidth.

Figure 3:
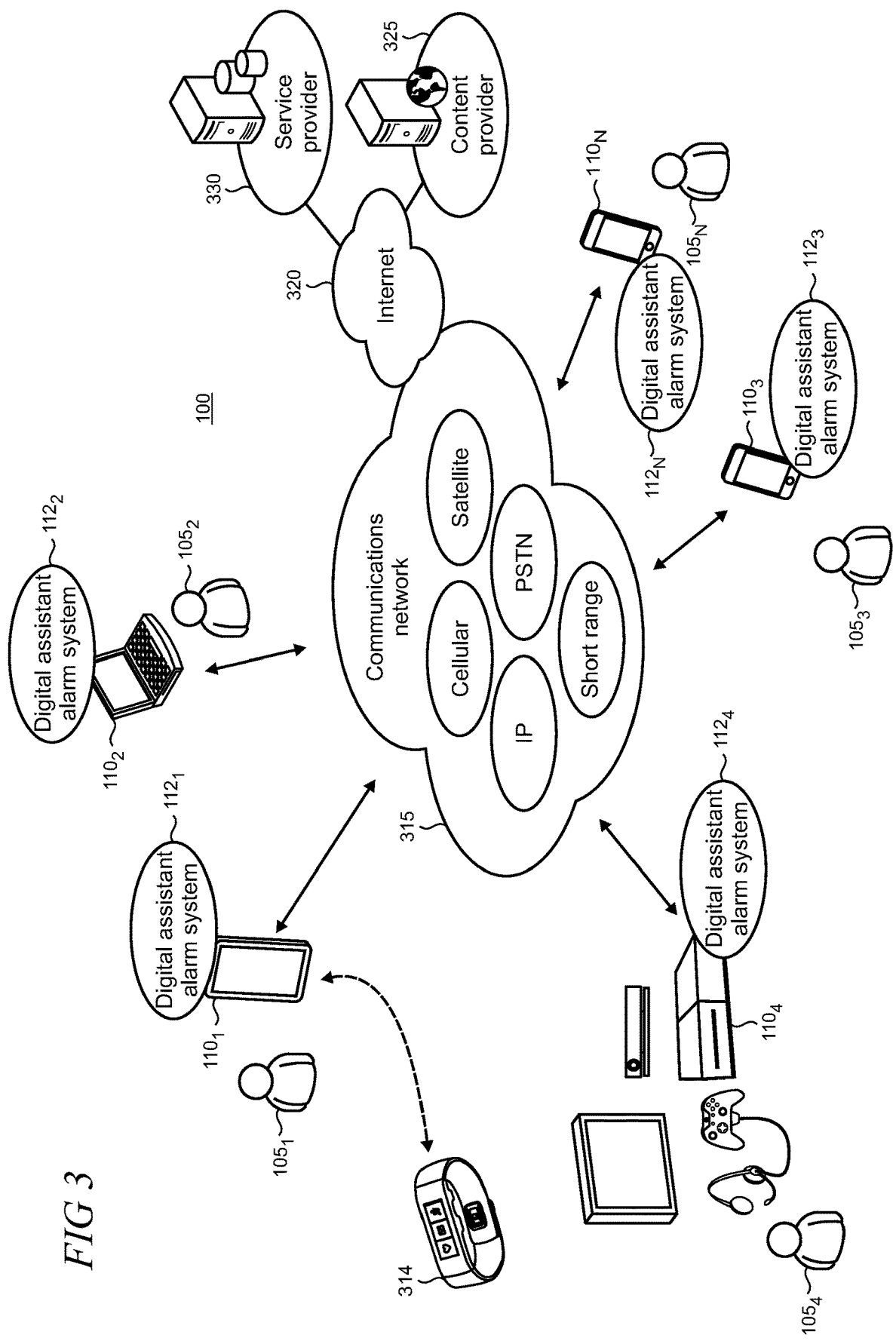
FIG. 3 shows an illustrative computing environment in which devices can communicate and interact over a network.

Various details of illustrative implementations of the present digital assistant alarm system are now presented. FIG. 3 shows an illustrative environment 100 in which various users 105 employ respective devices 110 that communicate over a communications network 315. Each device 110 includes a digital assistant alarm system 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

However, alternative types of electronic devices are also envisioned to be usable within the communications environment 100 so long as they are configured with communication capabilities and can connect to the communications network 315. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 315 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like. The communications network 315 typically includes interfaces that support a connection to the Internet 320 so that the mobile devices 110 can access content provided by one or more content providers 325 and also access a service provider 330 in some cases. Accordingly, the communications network 315 is typically enabled to support various types of device-to-device communications including over-the-top communications, and communications that do not utilize conventional telephone numbers in order to provide connectivity between parties.

Accessory devices 314, such as wristbands and other wearable devices may also be present in the environment 100. Such accessory device 314 typically is adapted to interoperate with a device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110.

Figure 4:
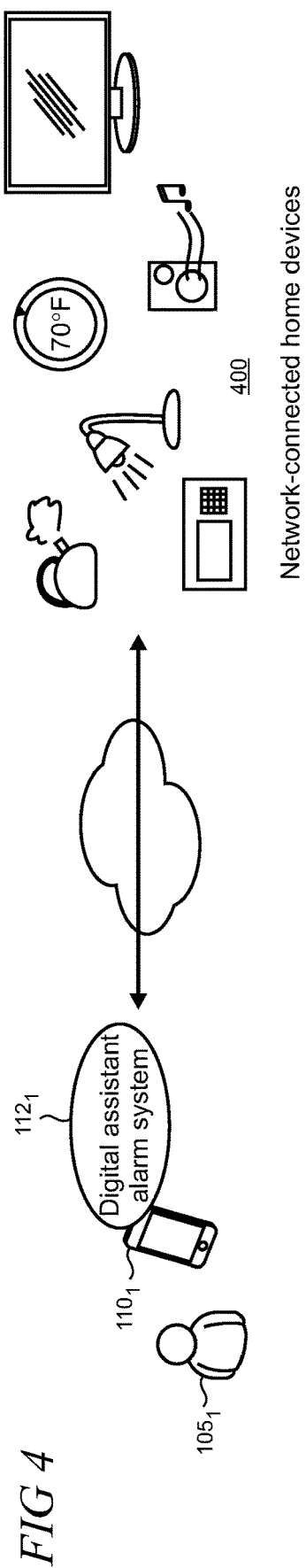
FIG. 4 shows a digital assistant alarm system interacting with illustrative network-connected home devices.

FIG. 4 shows that a device 110 and digital assistant alarm system 112 can be operatively coupled, typically using a network, with network-connected home devices 400 such as smart appliances, lighting, sound system, environmental controls, and the like.

Figure 5:
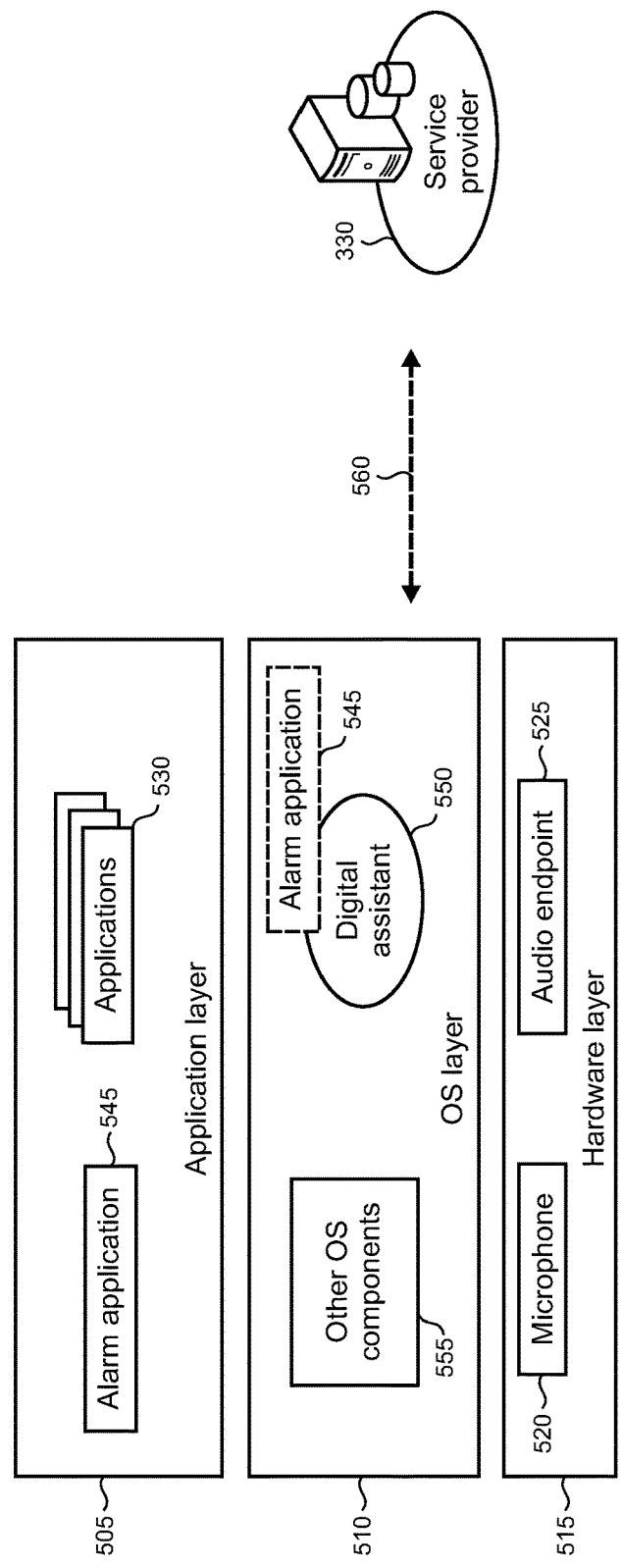
FIG. 5 shows an illustrative layered architecture that includes a digital assistant component and alarm application.

FIG. 5 shows an illustrative layered architecture 500 that may be instantiated on a given device 110. The architecture 500 is typically implemented in software, although combinations of software, firmware, and/or hardware may also be utilized in some cases. The architecture 500 is arranged in layers and includes an application layer 505, an OS (operating system) layer 510, and a hardware layer 515. The hardware layer 515 provides an abstraction of the various hardware used by the device 110 (e.g., input and output devices, networking and radio hardware, etc.) to the layers above it. In this illustrative example, the hardware layers support a microphone 520 and an audio endpoint 525 which may include, for example, the device's internal speaker, a wired or wireless headset/earpiece, external speaker/device, and the like.

The application layer 505 in this illustrative example supports various applications 530 (e.g., web browser, map app, email app, etc.), as well as an alarm application 545. The applications are often implemented using locally executing code. However in some cases, these applications may rely on services and/or remote code execution provided by remote servers or other computing platforms such as those supported by the service provider 330 or other cloud-based resources. While the alarm application is shown here as a component that is instantiated in the application layer 505, it will be appreciated that the functionality provided by a given application may be implemented, in whole or part, using components that are supported in either the OS or hardware layers.

The OS layer 510 supports a digital assistant 550 and various other OS components 555. In some cases, the digital assistant 550 can interact with the service provider 330, as indicated by line 560. That is, the digital assistant 550 in some implementations can partially utilize or fully utilize remote code execution supported at the service provider 330, or using other remote resources. In addition, it may utilize and/or interact with the other OS components 555 (and/or other components that are instantiated in the other layers of the architecture 500) as may be needed to implement the various features and functions described herein.

In some implementations, some or all of the functionalities supported by the alarm application 545 can be incorporated into the digital assistant as shown by the dashed rectangle in FIG. 5. In this description, the term "digital assistant alarm system" refers to the digital assistant 550 that includes the present alarm functionalities described herein, whether such functionalities are supported by discrete components such as the alarm application 545 or supported by the digital assistant directly.

Figure 6:
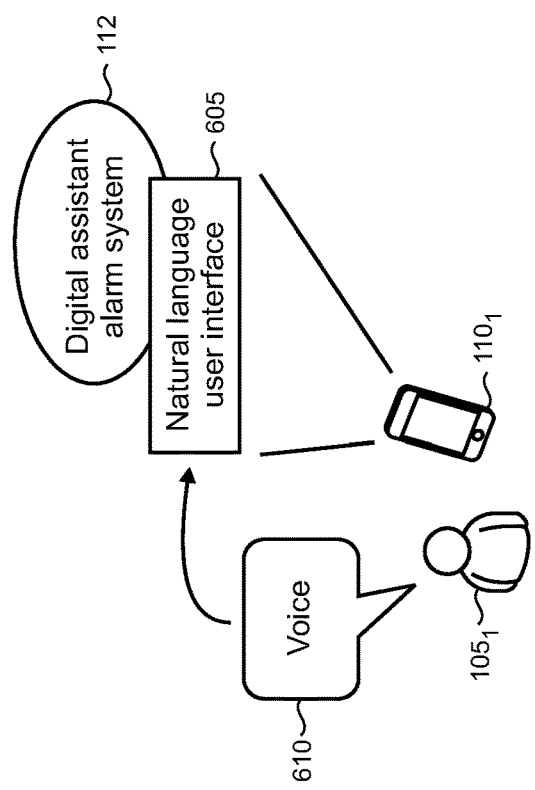

As shown in FIG. 6, the digital assistant alarm system 112 can employ a natural language user interface (UI) 605 that can take voice inputs 610 as inputs from the user 105. The voice inputs 610 can be used to invoke various actions, features, and functions on a device 110, provide inputs to the systems and applications, and the like. In some cases, the voice inputs 610 can be utilized on their own in support of a particular user experience while in other cases the voice inputs can be utilized in combination with other non-voice inputs or inputs such as those implementing physical controls on the device or virtual controls implemented on a UI or those using gestures (as described below).

Figure 7:
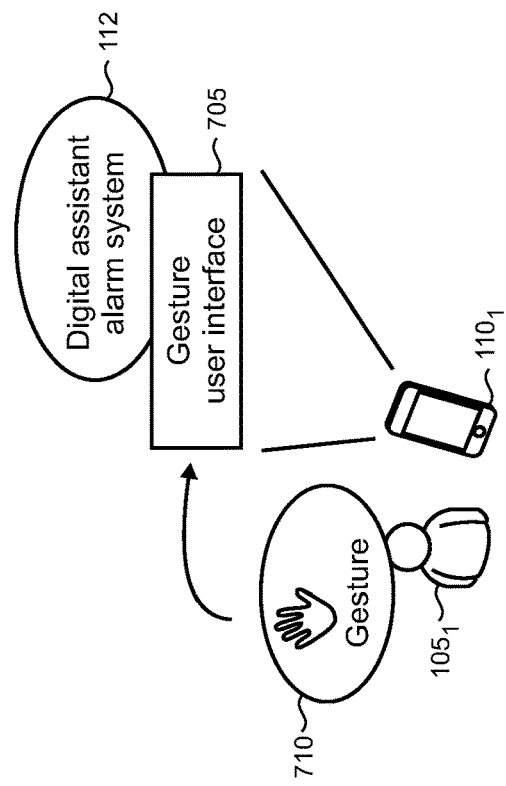
FIGS. 6 and 7 show illustrative interfaces between a user and a digital assistant alarm system.

The digital assistant alarm system 112 can also employ a gesture UI 705 as shown in FIG. 7. Here, the gesture UI 705 can sense gestures 710 performed by the user 105 as inputs to invoke various actions, features, and functions on a device 110, provide inputs to the systems and applications, and the like. The user gestures 710 can be sensed using various techniques such as optical sensing, touch sensing, proximity sensing, and the like. In some cases, various combinations of voice commands, gestures, and physical manipulation of real or virtual controls can be utilized to interact with the digital assistant. In some scenarios, the digital assistant can be automatically invoked. For example, as the digital assistant typically maintains awareness of device state and other context, the digital assistant may be invoked by specific context such as user input, received notifications, or detected events.

Figure 8:
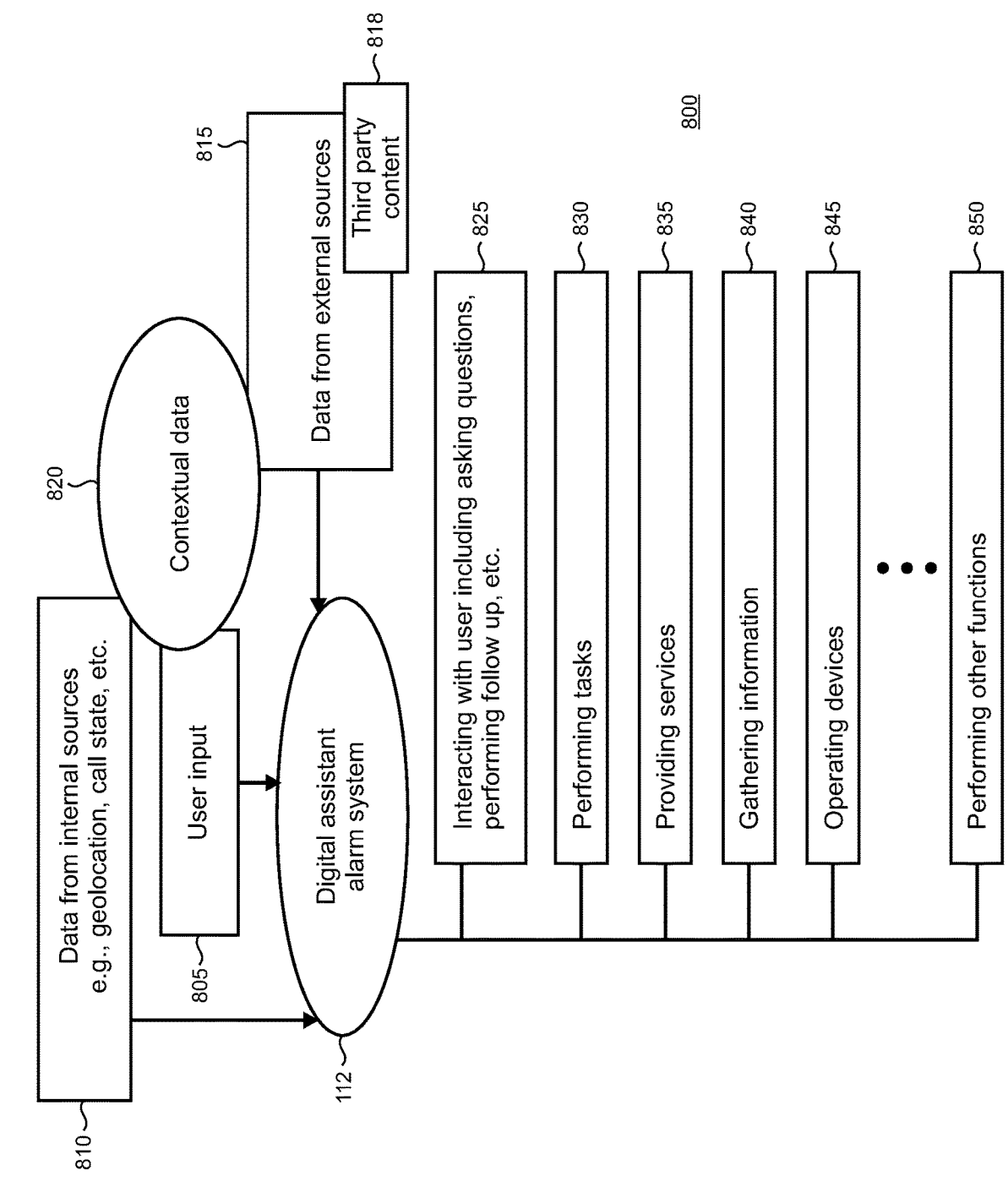
FIG. 8 shows illustrative inputs to a digital assistant alarm system and an illustrative taxonomy of general functions that may be performed by a digital assistant alarm system.

FIG. 8 shows an illustrative taxonomy of functions 800 that may typically be supported by the digital assistant alarm system 112. Inputs to the digital assistant alarm system 112 typically can include user input 805, data from internal sources 810, and data from external sources 815 which can include third-party content 818. For example, data from internal sources 810 could include the current location of the device 110 that is reported by a GPS (Global Positioning System) component on the device, or some other location-aware component. The externally sourced data 815 includes data provided, for example, by external systems, databases, services, and the like such as the service provider 330 (FIG. 3). The various inputs can be used alone or in various combinations to enable the digital assistant alarm system 112 to utilize contextual data 820 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 800 illustratively include interacting with the user 825 (through the natural language UI and other graphical UIs, for example); performing tasks 830 (e.g., making note of appointments in the user's calendar, sending messages and emails, etc.); providing services 835 (e.g., answering questions from the user, mapping directions to a destination, setting alarms, forwarding notifications, etc.); gathering information 840 (e.g., finding information requested by the user about a book or movie, locating the nearest Italian restaurant, etc.); operating devices 845 (e.g., setting preferences, adjusting screen brightness, turning wireless connections such as Wi-Fi and Bluetooth on and off, communicating with other devices, controlling smart appliances, etc.); and performing various other functions 850. The list of functions 800 is not intended to be exhaustive and other functions may be provided by the digital assistant as may be needed for a particular implementation of the present digital assistant alarm system.

Figure 11:
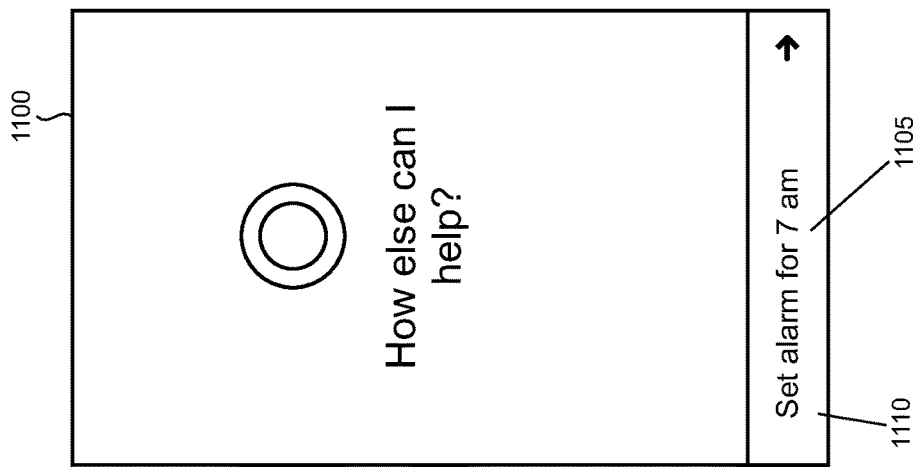
FIGS. 9, 10, and 11 show screen captures of illustrative user interfaces (UIs) exposed by a digital assistant.
Figure 10:
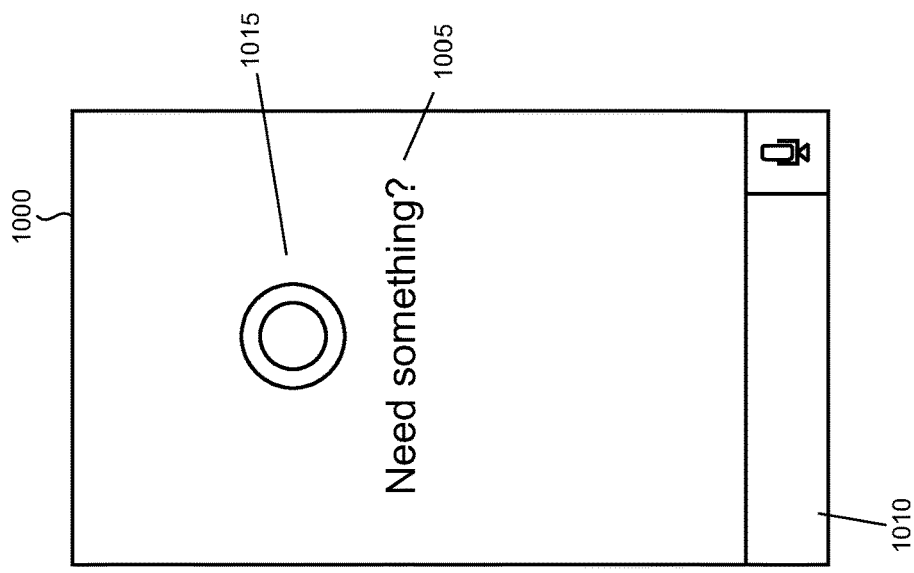
Figure 9:
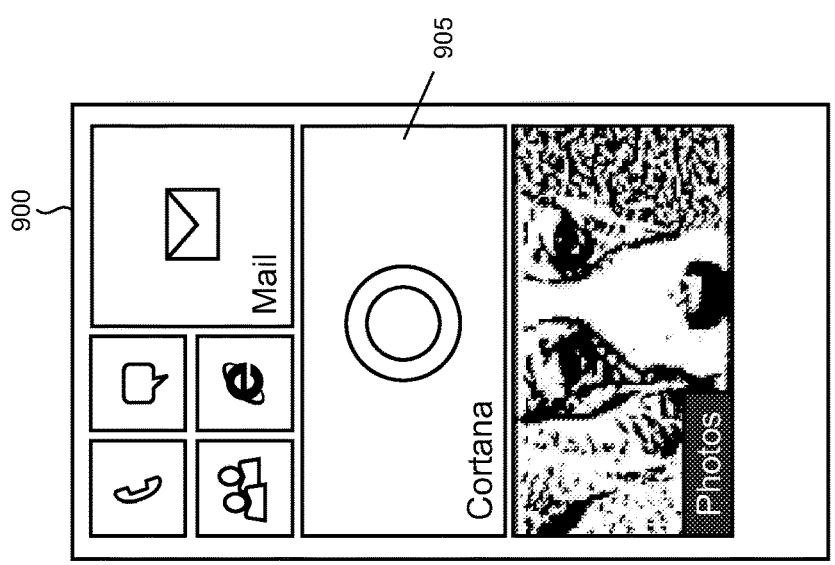

The digital assistant alarm system 112 can be exposed to the user 105 through a UI that is displayed on the device 110. For example, FIGS. 9, 10, and 11 show various screen captures of illustrative UIs that may be utilized by the present digital assistant alarm system. It is emphasized that the particular UIs displayed in the drawings can vary from what is shown according to the needs of a particular implementation. UI 900 in FIG. 9 shows the digital assistant (named "Cortana" as discussed above) represented by a tile 905 that is displayed along with tiles representing other apps or user experiences on a start screen of a device. The digital assistant may also be configured to be launched from any location within any UI on the device, or from within any current user experience. For example, the user 105 can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

When the user invokes the digital assistant, for example, by touching the tile 905 or by invoking a voice command (e.g., "Hey Cortana") or gesture, a UI 1000 shown in FIG. 10 is displayed on the device 110 that includes a text string 1005 that asks the user if something is needed. In alternative implementations, text to voice translation can be employed so that an audio message can be played in place of, or to supplement the text string 1005. As shown, the UI includes a box 1010 that is configured for showing a textual representation of a received voice command or other user input.

One or more graphic objects 1015 can be displayed on the UI 1000 to represent the digital assistant to the user. The graphic object 1015 in this example is a circular shape that can be animated so that, for example, it changes its shape, color, transparency, motion, or appearance as the digital assistant performs tasks, provides information, interacts with the user, etc.

As shown in the UI 1100 in FIG. 1100, the user has input the string 1105 "set alarm for 7 am" into the box 1110 using, for example, keypad or voice input. In response to the input, the digital assistant can launch an alarm setting routine on the device 110 as illustratively described in the use scenarios above.

Figure 12:
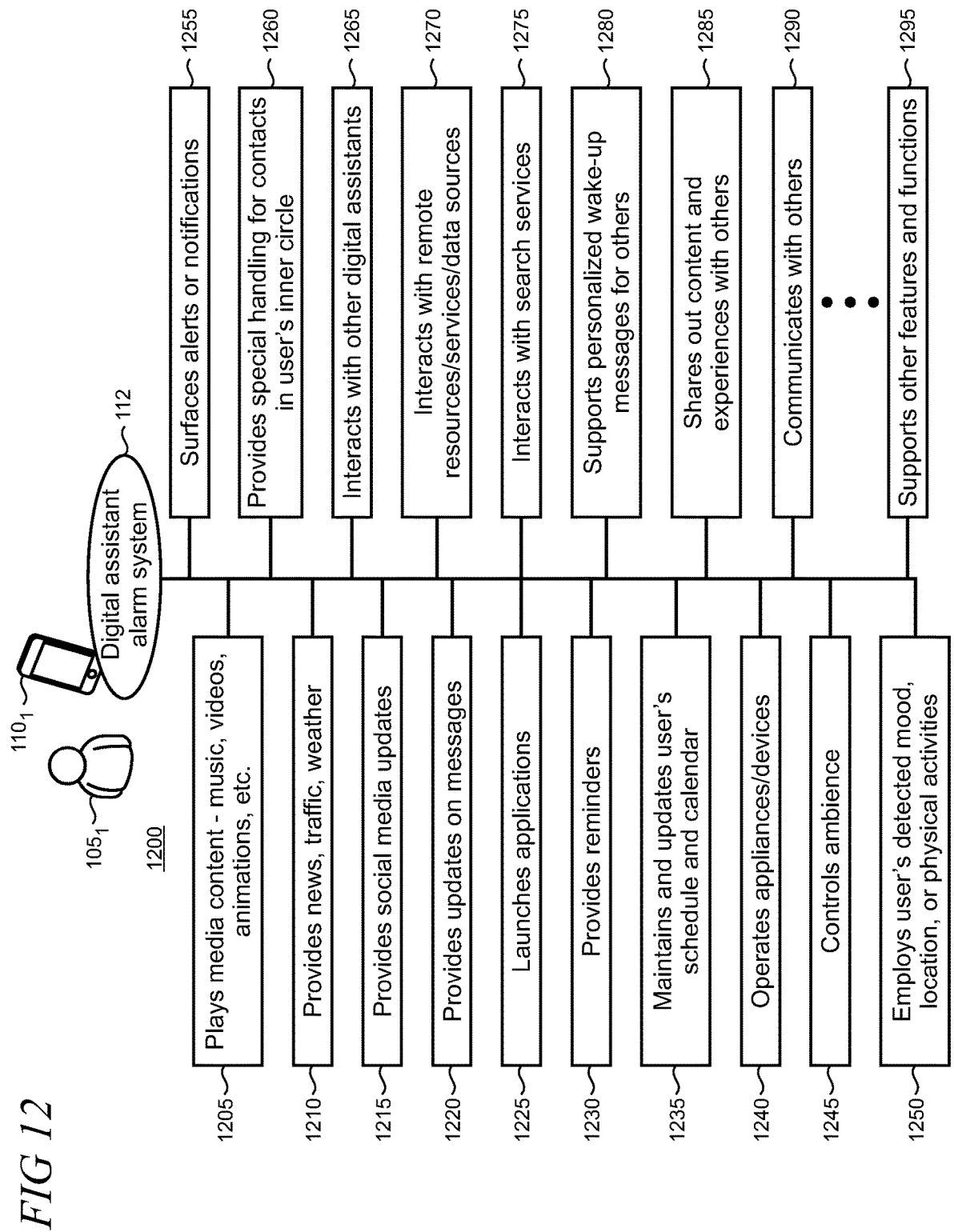
FIG. 12 shows an illustrative taxonomy of specific functions that may be performed by a digital assistant alarm system during a given wake-up and summary experience.

FIG. 12 provides a taxonomy 1200 of various illustrative examples of features that may be provided, and functions that may be performed by the digital assistant alarm system 112 to support wake-up and summary experiences. The features and functions presented here are intended to be illustrative and not exhaustive and other features/functions may be utilized to meet the needs of a particular implementation and not all of the features/functions need to be supported and/or utilized in every implementation.

As shown, the taxonomy 1200 includes the digital assistant alarm system: playing media content (as indicated by reference numeral 1205) such as music, videos, and/or animations in which the digital assistant alarm system can function as a disc jockey in some cases by introducing the music that is being played; providing news, traffic or weather updates 1210 by showing information on the device's display screen or on a connected device, or by reading the information aloud; providing updates for social media 1215 such as new Facebook® notifications that can be shown or read out; providing updates on messages 1220 such as emails, text messages, etc.; launching applications 1225, for example, to help the user quickly get to content or experiences of interest; providing reminders 1230; maintaining and updating the user's schedule and calendar 1235; operating devices and/or appliances 1240 such as network-connected and home automation devices; controlling ambience 1245; employing the user's detected mood, location, or physical activities 1250 when catering a wake-up experience; surfacing alerts or notifications 1255 such as weather alerts, application notifications, and the like; providing special handling for contacts that are in the user's inner circle 1260, such as giving priority to emails during the summary from specially designated contacts such as family members, colleagues, friends, etc.; interacting with digital assistants on devices of others 1265; interacting with remote resources/services/data sources 1270 such as web resources associated with work, school, etc.; interacting with search services 1275 such as Bing®; supporting personalized wake-up messages for others 1280; sharing out content and experiences with others 1285; communicating with others 1290; and, supporting other features and functions 1295 as may be needed for a given implementation of a digital assistant alarm system.

With respect to the detected mood of the user, a variety of data may be analyzed in order to determine mental or emotional state. For example, analysis may be performed using one or more of i) facial expressions; ii) location; iii) physical input characteristics including one or more of rate of device turn on/turn off or input interaction; iv) application interaction; v) physiological characteristics of the user including heart rate, electrodermal data, electrocardiogram data, or electroencephalogram data; vi) device/network connection data; vii) device battery/charging data; viii) proximity of the device to objects or people; ix) explicitly- provided user input about mental or emotional state; or x) voice inputs to the UI. In some implementations, the mood detection techniques may be utilized as described in U.S. patent application Ser. No. 14/472,113 entitled "Emotionally Intelligent Systems" and assigned to the same assignee as the present application, the disclosure of which is incorporated by reference having the same effect as if set forth at length herein.

Figure 13:
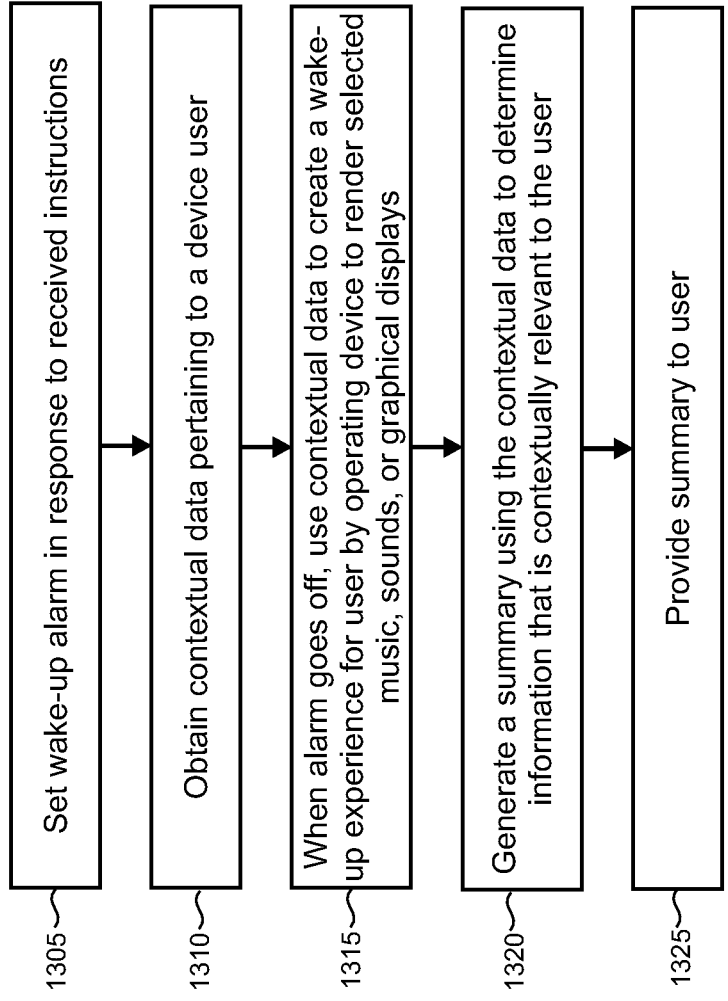
FIGS. 13, 14, and 15 show illustrative methods that may be performed when implementing the present digital assistant alarm system.

FIG. 13 shows a flowchart of an illustrative method 1300 for operating a digital assistant on a device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, the digital assistant sets a wake-up alarm in response to received instructions, such as those from the device user. In step 1310, contextual data is obtained that pertains to the user, for example from the various sources shown in FIG. 8 and described in the accompanying text. In step 1315, when the alarm goes off, the digital assistant uses the contextual data to create a wake-up experience for the user by operating the device to render selected music, sounds, or graphical displays on the device. In step 1320, the digital assistant generates a summary using the contextual data to determine information that is contextually relevant to the user. In step 1325, the digital assistant provides the summary to the user, for example, by reading it aloud to the user and/or showing the summary on the device display for the user to peruse.

Figure 14:
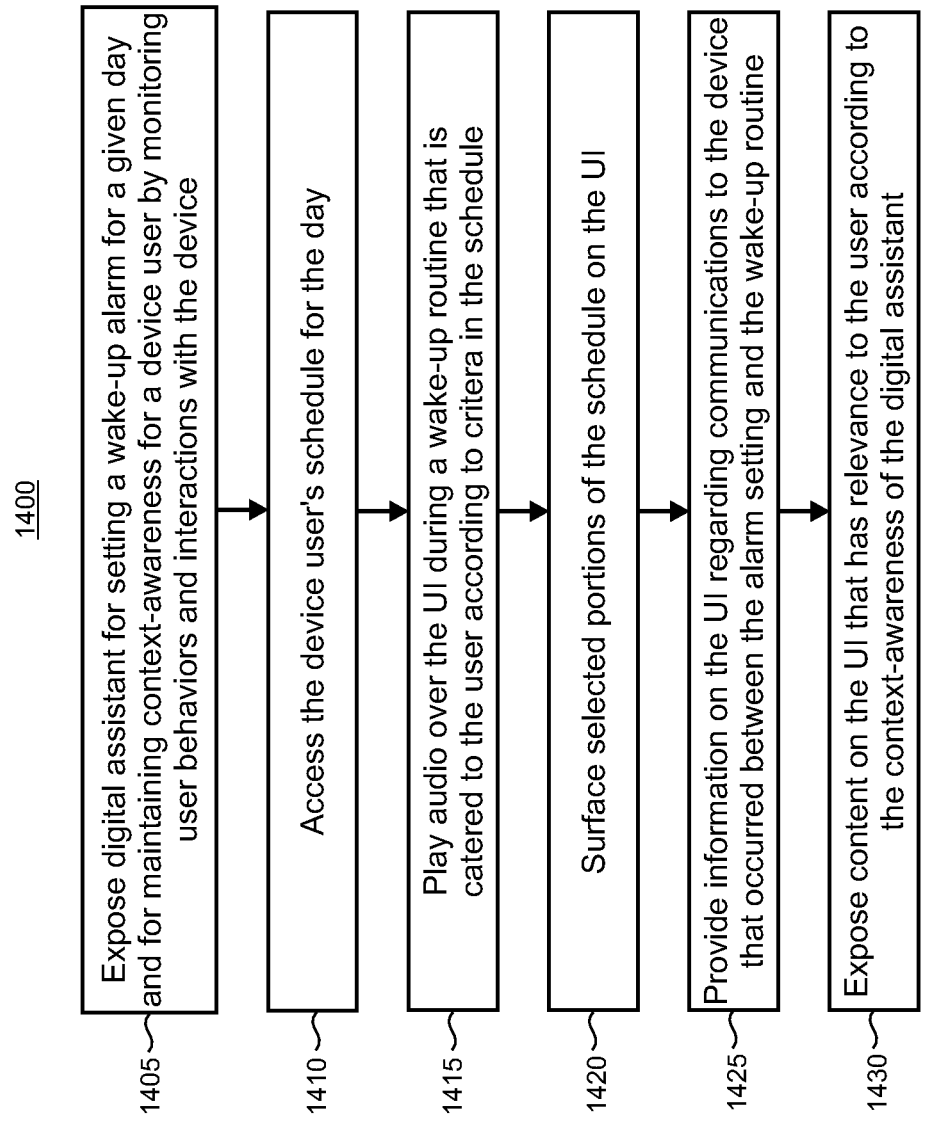

FIG. 14 shows a flowchart of an illustrative method 1400 that may be performed by a device that hosts a digital assistant. In step 1405, a digital assistant is exposed for setting a wake-up alarm for a given day and for maintaining context-awareness for a device user by monitoring user behaviors and interactions with the device. In step 1410, the device user's schedule is accessed. Typically, the schedule is stored on the device, but it may also be accessed from remote stores and/or resources in some cases. In step 1415, audio is played over the device UI during a wake-up routine that is catered to the user according to criteria in the schedule. Thus, for example, when the user has a busy day during the week, the digital assistant can play music that is intended to get the user motivated and ready to tackle the day. On the weekend, when the user may have a more relaxed schedule, the digital assistant can play softer, more calming music to gently wake the user. In step 1420, the digital assistant surfaces various portions of the user's schedule on the UI, for example by reading out appointments and events, or showing them on the device display.

In step 1425, the digital assistant provides information on the UI regarding communications to the device that occurred between the alarm setting and the wake-up routine. The information can be provided either graphically on the device display or using sound, depending on the user's choice. In step 1430, the digital assistant exposes content on the UI that has relevance to the user according to the context-awareness of the digital assistant. The content can be exposed either graphically on the device display or using sound, depending on the user's choice.

Figure 15:
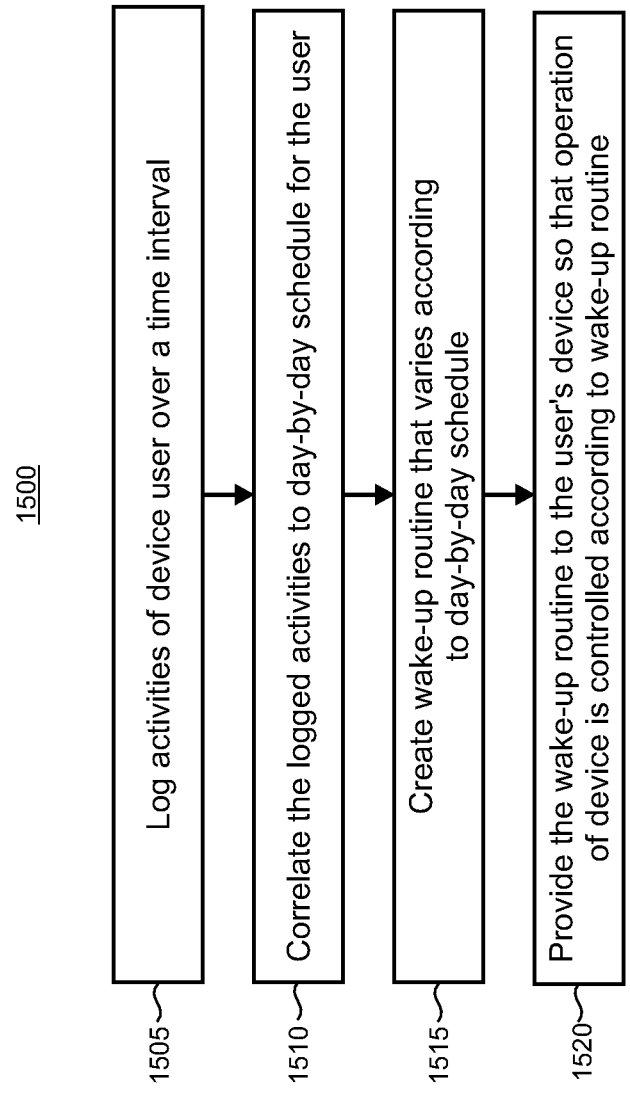

FIG. 15 shows a flowchart of an illustrative method 1500 that may be performed by a server such as one utilized by a remote provider (e.g., service provider 330 and/or content provider 325 shown in FIG. 3 and described in the accompanying text). In step 1505, activities of the user when interacting with a device hosting a digital assistant are logged over some time interval. In step 1510, the logged activities are correlated with a day-by-day schedule of the user. So, for example, such correlation may enable the user's behaviors and routines on weekdays to be differentiated from those which occur on weekends. Or, the user may have a different schedule on Mondays and Wednesdays because of night classes compared with the rest of the week. In step 1515, a wake-up routine is created that varies according to the user's day-by-day schedule. In step 1520, the wake-up routine is provided to the user's device so that its operations can be controlled according to the routine.

Figure 16:
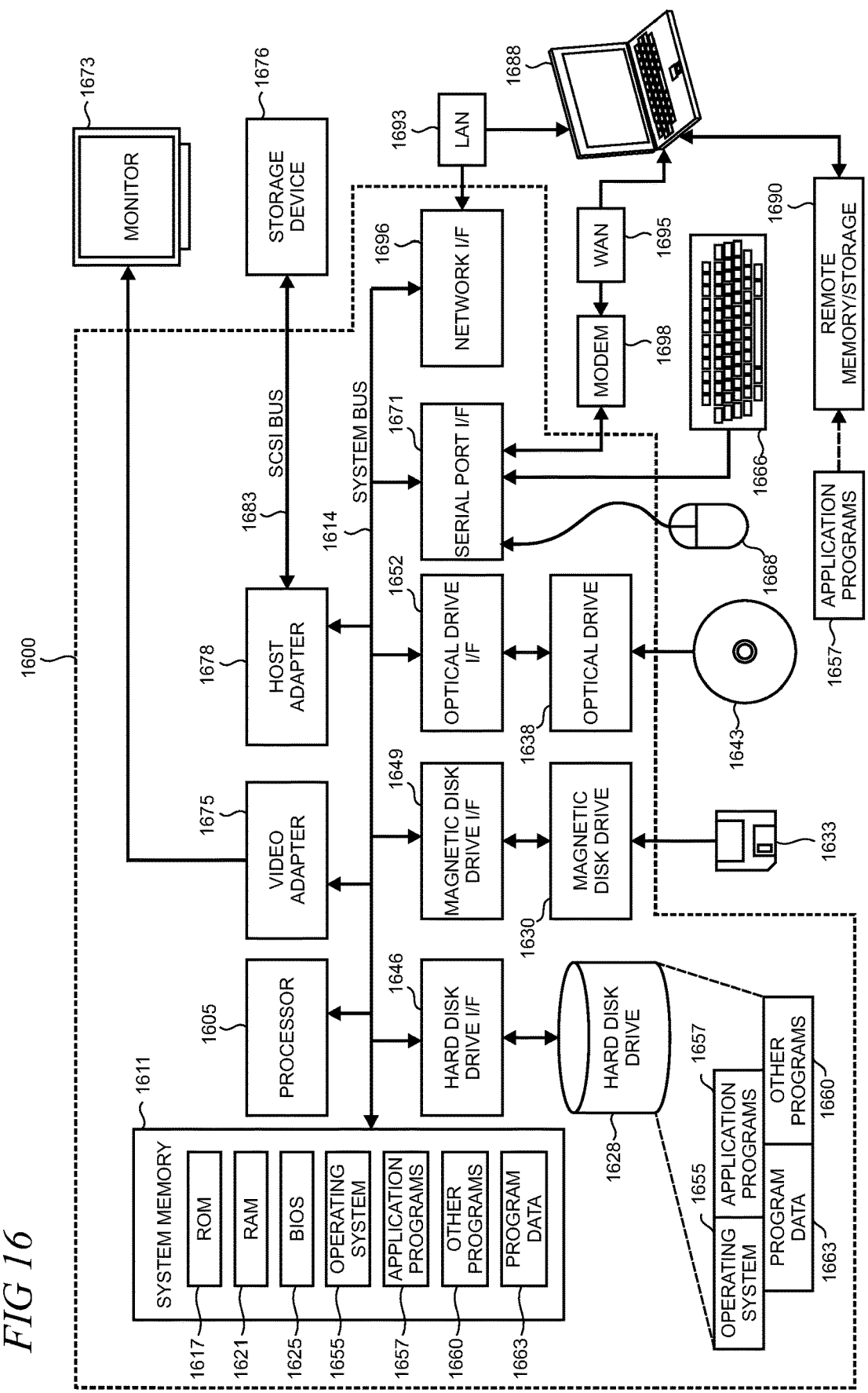
FIG. 16 is a simplified block diagram of an illustrative computer system such as a personal computer (PC) that may be used in part to implement the present digital assistant alarm system.

FIG. 16 is a simplified block diagram of an illustrative computer system 1600 such as a PC, client machine, or server with which the present digital assistant alarm system may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present digital assistant alarm system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present digital assistant alarm system.

Figure 17:
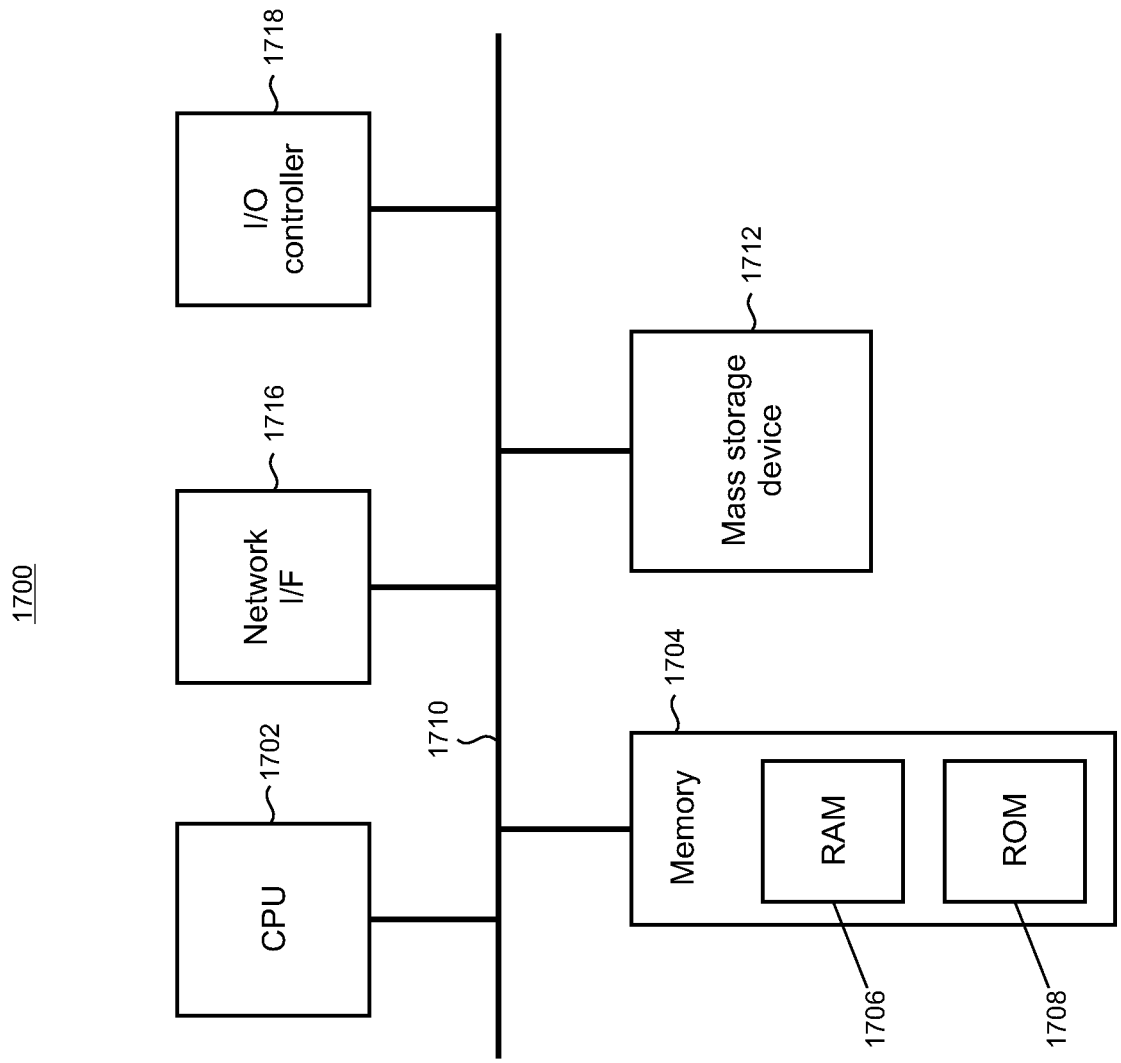
FIG. 17 shows a block diagram of an illustrative device that may be used in part to implement the present digital assistant alarm system.

FIG. 17 shows an illustrative architecture 1700 for a device capable of executing the various components described herein for providing the present digital assistant alarm system. Thus, the architecture 1700 illustrated in FIG. 17 shows an architecture that may be adapted for a server computer, mobile phone, a PDA, a smartphone, a desktop computer, a netbook computer, a tablet computer, GPS device, gaming console, and/or a laptop computer. The architecture 1700 may be utilized to execute any aspect of the components presented herein.

The architecture 1700 illustrated in FIG. 17 includes a CPU (Central Processing Unit) 1702, a system memory 1704, including a RAM 1706 and a ROM 1708, and a system bus 1710 that couples the memory 1704 to the CPU 1702. A basic input/output system containing the basic routines that help to transfer information between elements within the architecture 1700, such as during startup, is stored in the ROM 1708. The architecture 1700 further includes a mass storage device 1712 for storing software code or other computer-executed code that is utilized to implement applications, the file system, and the operating system.

The mass storage device 1712 is connected to the CPU 1702 through a mass storage controller (not shown) connected to the bus 1710. The mass storage device 1712 and its associated computer-readable storage media provide non-volatile storage for the architecture 1700.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It should be appreciated that the network interface unit 1716 also may be utilized to connect to other types of networks and remote computer systems. The architecture 1700 also may include an input/output controller 1718 for receiving and processing input from a number of other devices, including a keyboard, mouse, or electronic stylus (not shown in FIG. 17). Similarly, the input/output controller 1718 may provide output to a display screen, a printer, or other type of output device (also not shown in FIG. 17).

It should be appreciated that the software components described herein may, when loaded into the CPU 1702 and executed, transform the CPU 1702 and the overall architecture 1700 from a general-purpose computing system into a special-purpose computing system customized to facilitate the functionality presented herein. The CPU 1702 may be constructed from any number of transistors or other discrete circuit elements, which may individually or collectively assume any number of states. More specifically, the CPU 1702 may operate as a finite-state machine, in response to executable instructions contained within the software modules disclosed herein. These computer-executable instructions may transform the CPU 1702 by specifying how the CPU 1702 transitions between states, thereby transforming the transistors or other discrete hardware elements constituting the CPU 1702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1700 in order to store and execute the software components presented herein. It also should be appreciated that the architecture 1700 may include other types of computing devices, including handheld computers, embedded computer systems, smartphones, PDAs, and other types of computing devices known to those skilled in the art. It is also contemplated that the architecture 1700 may not include all of the components shown in FIG. 17, may include other components that are not explicitly shown in FIG. 17, or may utilize an architecture completely different from that shown in FIG. 17.

Figure 18:
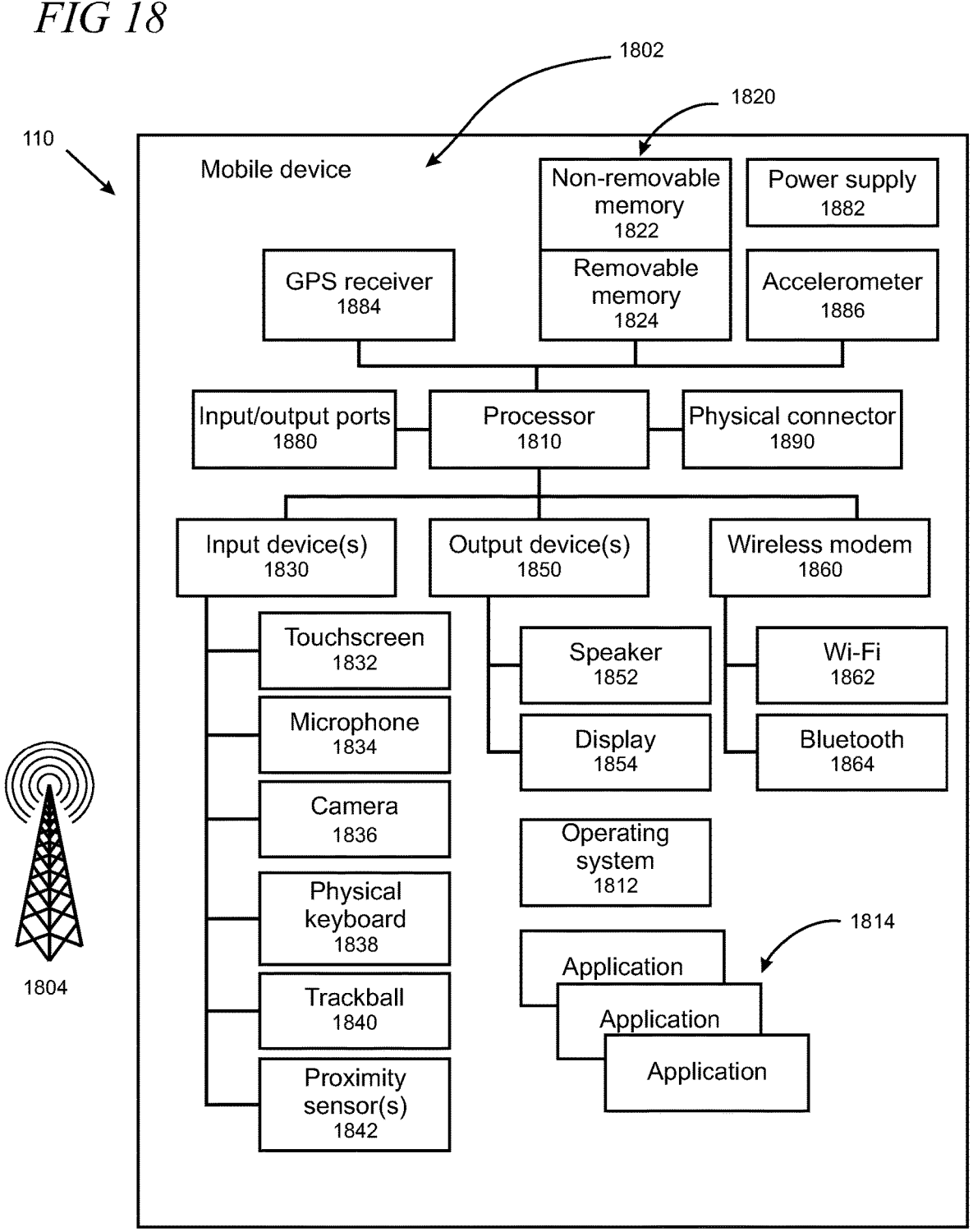
FIG. 18 is a block diagram of an illustrative mobile device.

FIG. 18 is a functional block diagram of an illustrative device 110 such as a mobile phone or smartphone including a variety of optional hardware and software components, shown generally at 1802. Any component 1802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1804, such as a cellular or satellite network.

The illustrated device 110 can include a controller or processor 1810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1812 can control the allocation and usage of the components 1802, including power states, above-lock states, and below-lock states, and provides support for one or more application programs 1814. The application programs can include common mobile computing applications (e.g., image-capture applications, email applications, calendars, contact managers, web browsers, messaging applications), or any other computing application.

The illustrated device 110 can include memory 1820. Memory 1820 can include non-removable memory 1822 and/or removable memory 1824. The non-removable memory 1822 can include RAM, ROM, Flash memory, a hard disk, or other well-known memory storage technologies. The removable memory 1824 can include Flash memory or a Subscriber Identity Module (SIM) card, which is well known in GSM (Global System for Mobile communications) systems, or other well-known memory storage technologies, such as "smart cards." The memory 1820 can be used for storing data and/or code for running the operating system 1812 and the application programs 1814. Example data can include web pages, text, images, sound files, video data, or other data sets to be sent to and/or received from one or more network servers or other devices via one or more wired or wireless networks.

The memory 1820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 1820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 1830; such as a touch screen 1832; microphone 1834 for implementation of voice input for voice recognition, voice commands and the like; camera 1836; physical keyboard 1838; trackball 1840; and/or proximity sensor 1842; and one or more output devices 1850, such as a speaker 1852 and one or more displays 1854. Other input devices (not shown) using gesture recognition may also be utilized in some cases. Other possible output devices (not shown) can include piezoelectric or haptic output devices. Some devices can serve more than one input/output function. For example, touchscreen 1832 and display 1854 can be combined into a single input/output device.

A wireless modem 1860 can be coupled to an antenna (not shown) and can support two-way communications between the processor 1810 and external devices, as is well understood in the art. The modem 1860 is shown generically and can include a cellular modem for communicating with the mobile communication network 1804 and/or other radio-based modems (e.g., Bluetooth 1864 or Wi-Fi 1862). The wireless modem 1860 is typically configured for communication with one or more cellular networks, such as a GSM network for data and voice communications within a single cellular network, between cellular networks, or between the device and a public switched telephone network (PSTN).

The device can further include at least one input/output port 1880, a power supply 1882, a satellite navigation system receiver 1884, such as a GPS receiver, an accelerometer 1886, a gyroscope (not shown), and/or a physical connector 1890, which can be a USB port, IEEE 1394 (FireWire) port, and/or an RS-232 port. The illustrated components 1802 are not required or all-inclusive, as any components can be deleted and other components can be added.

Figure 19:
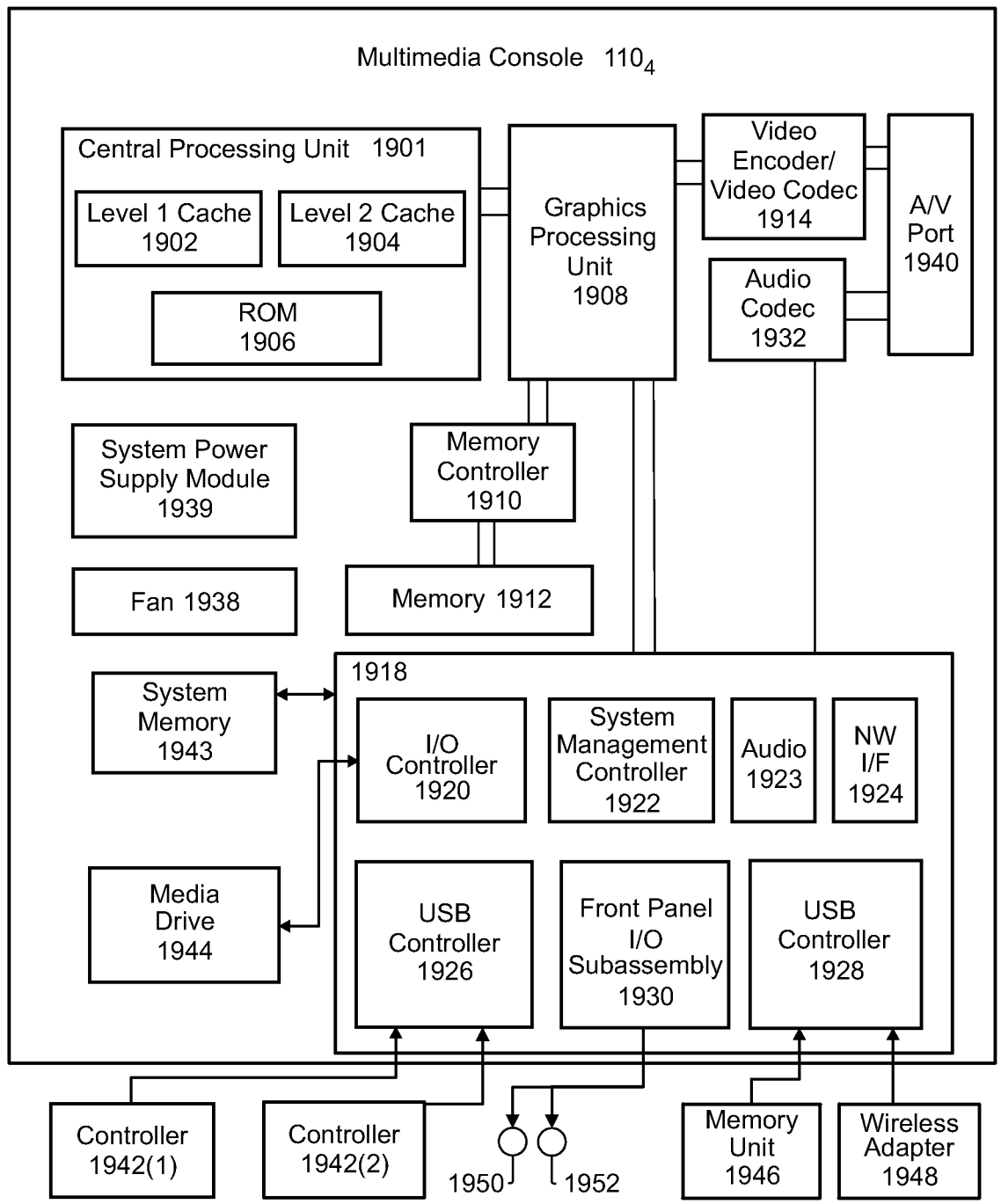
FIG. 19 is a block diagram of an illustrative multimedia console.

FIG. 19 is an illustrative functional block diagram of a multimedia console $110_4$. The multimedia console $110_4$ has a central processing unit (CPU) 1901 having a level 1 cache 1902, a level 2 cache 1904, and a Flash ROM (Read Only Memory) 1906. The level 1 cache 1902 and the level 2 cache 1904 temporarily store data and hence reduce the number of memory access cycles, thereby improving processing speed and throughput. The CPU 1901 may be configured with more than one core, and thus, additional level 1 and level 2 caches 1902 and 1904. The Flash ROM 1906 may store executable code that is loaded during an initial phase of a boot process when the multimedia console $110_4$ is powered ON.

A graphics processing unit (GPU) 1908 and a video encoder/video codec (coder/decoder) 1914 form a video processing pipeline for high speed and high resolution graphics processing. Data is carried from the GPU 1908 to the video encoder/video codec 1914 via a bus. The video processing pipeline outputs data to an A/V (audio/video) port 1940 for transmission to a television or other display. A memory controller 1910 is connected to the GPU 1908 to facilitate processor access to various types of memory 1912, such as, but not limited to, a RAM.

The multimedia console $110_4$ includes an I/O controller 1920, a system management controller 1922, an audio processing unit 1923, a network interface controller 1924, a first USB (Universal Serial Bus) host controller 1926, a second USB controller 1928, and a front panel I/O subassembly 1930 that are preferably implemented on a module 1918. The USB controllers 1926 and 1928 serve as hosts for peripheral controllers 1942(1) and 1942(2), a wireless adapter 1948, and an external memory device 1946 (e.g., Flash memory, external CD/DVD ROM drive, removable media, etc.). The network interface controller 1924 and/or wireless adapter 1948 provide access to a network (e.g., the Internet, home network, etc.) and may be any of a wide variety of various wired or wireless adapter components including an Ethernet card, a modem, a Bluetooth module, a cable modem, or the like.

System memory 1943 is provided to store application data that is loaded during the boot process. A media drive 1944 is provided and may comprise a DVD/CD drive, hard drive, or other removable media drive, etc. The media drive 1944 may be internal or external to the multimedia console $110_4$. Application data may be accessed via the media drive 1944 for execution, playback, etc. by the multimedia console $110_4$. The media drive 1944 is connected to the I/O controller 1920 via a bus, such as a Serial ATA bus or other high speed connection (e.g., IEEE 1394).

The system management controller 1922 provides a variety of service functions related to assuring availability of the multimedia console $110_4$. The audio processing unit 1923 and an audio codec 1932 form a corresponding audio processing pipeline with high fidelity and stereo processing. Audio data is carried between the audio processing unit 1923 and the audio codec 1932 via a communication link. The audio processing pipeline outputs data to the A/V port 1940 for reproduction by an external audio player or device having audio capabilities.

The front panel I/O subassembly 1930 supports the functionality of the power button 1950 and the eject button 1952, as well as any LEDs (light emitting diodes) or other indicators exposed on the outer surface of the multimedia console $110_4$. A system power supply module 1939 provides power to the components of the multimedia console $110_4$. A fan 1938 cools the circuitry within the multimedia console $110_4$.

The CPU 1901, GPU 1908, memory controller 1910, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 1943 into memory 1912 and/or caches 1902 and 1904 and executed on the CPU 1901. The application may present a graphical user interface that provides a consistent user experience when navigating to different media types available on the multimedia console $110_4$. In operation, applications and/or other media contained within the media drive 1944 may be launched or played from the media drive 1944 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 1924 or the wireless adapter 1948, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1942(1) and 1942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present digital assistant alarm system are now presented by way of illustration and not as an exhaustive list of all embodiments. An example includes a method for using a digital assistant operating on a device to provide a catered wake-up experience, comprising: setting a wake-up alarm in response to received instructions; obtaining contextual data pertaining to a device user; when the wake-up alarm goes off, using the contextual data to create a wake-up experience for the user by operating the device to render selected music, sounds, or graphical displays on the device; generating a summary using the contextual data to determine information that is contextually relevant to the user; and providing the summary to the user.

In another example, the method further includes setting the wake-up alarm to occur at a time or in response to an occurrence of an event, the digital assistant being configured to monitor for the event occurrence. In another example, the contextual data comprises one or more of time/date, location of the user or device, language, schedule, applications installed on the device, user preferences, user behaviors, user activities, stored contacts, call history, messaging history, browsing history, device type, device capabilities, or communication network type. In another example, the method further includes configuring the digital assistant for verbally reading out the summary or displaying the summary on the device or displaying the summary on another device that is operatively coupled to the device. In another example, the method further includes monitoring user behaviors over a time interval and adjusting the catered wake-up experience in response to the monitored user behaviors. In another example, the method further includes controlling ambience using one of sound, music, or lighting. In another example, the method further includes controlling a network-connected appliance or device. In another example, the method further includes interacting with a digital assistant instantiated on the network-connected appliance or device. In another example, the method further includes launching an application to pre-fetch data for the user to review after waking, the application being launched on the device or on a connected device. In another example, the method further includes configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

A further example includes a device, comprising: one or more processors; a user interface (UI) for interacting with a user of the device using one of visual display or audio; and a memory device storing computer-readable instructions which, when executed by the one or more processors, perform a method comprising the steps of: exposing a digital assistant for setting a wake-up alarm for a given day and for maintaining context-awareness for a device user by monitoring user behaviors and interactions with the device, accessing the device user's schedule for the day, playing audio over the UI during a wake-up routine that is catered to the user according criteria in the schedule, surfacing selected portions of the schedule on the UI, the schedule portions being rendered graphically or auditorily according to user interaction with the digital assistant, providing information on the UI regarding communications to the device that occurred between the alarm setting and the wake-up routine, the provided information being rendered graphically or auditorily according to user interaction with the digital assistant, and exposing content on the UI that has relevance to the user according to the context-awareness of the digital assistant, the exposed content being rendered graphically or auditorily according to user interaction with the digital assistant.

In another example, the device further includes a motion sensor and using data from the motion sensor to put the alarm in snooze when the device is shaken. In another example, the device further includes performing one of the surfacing, providing, or exposing when a sensor in the device indicates that the device has been picked up. In another example, the device further includes one or more sensors for detecting ambient conditions. In another example, the device further includes interoperating with a remote server to retrieve data or services to support the catered wake-up experience. In another example, the communication information pertains to one of text message, email, alert, or social media notification. In another example, the UI includes a graphical user interface or a natural language interface. In another example, the device further includes monitoring user behaviors and interactions with the device with regard to application usage and web browsing. In another example, the device further includes detecting a mood of the user using analysis of one or more of i) facial expressions; ii) location; iii) physical input characteristics including one or more of rate of device turn on/turn off or input interaction; iv) application interaction; v) physiology characteristics of the user including heart rate, electrodermal data, electrocardiogram data, or electroencephalogram data; vi) device/network connection data; vii) device battery/charging data; viii) proximity of the device to objects or people; ix) explicitly-provided user input about mental or emotional state; or x) voice inputs to the UI and adjusting the wake-up routine according to the detected mood.

A further example includes one or more computer-readable storage media storing instructions which, when executed by one or more processors disposed in a computer server, perform a method comprising the steps of: logging activities of a user when interacting with a device hosting a digital assistant over a time interval; correlating the logged activities to a day-by-day schedule for the user; creating a wake-up routine that varies according to the day-by-day schedule, the wake-up routine including a wake-up experience and daily summary of information that are catered to the user to be contextually relevant; providing the wake-up routine to the user's device so that operation of the device is controlled according to the wake-up routine, the device at least including a graphical user interface and support for an audio endpoint.

Based on the foregoing, it should be appreciated that technologies for a digital assistant alarm system have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for operating a device for providing a catered wake-up experience, comprising:
    setting a wake-up alarm in response to received instructions;
    obtaining contextual data pertaining to a device user;
    inferring a new wake-up setting for the device user through a combination of heuristics, pattern recognition methods, learning-algorithms and/or policies that take into account available inputs, contexts and the device user's behaviors and interactions;
    interacting with the device user to confirm the new wake-up setting, the interacting with the device user including asking a clarifying question and receiving the device user's answer to the clarifying question;
    automatically collaborating with a plurality of applications that are distinct from the wake-up alarm, wherein the collaborating includes identifying incoming notifications for the applications that are unique to the respective applications, the device receiving the incoming notifications while the device is not in use;
    automatically extracting contents from the incoming notifications that are dynamic, personal, and unique to the device user;
    using the contextual data pertaining to the device user, determining a contextual relevancy of the content of each incoming notification to the device user;
    selecting, based on the determined contextual relevancy, portions of the contents of the incoming notifications to generate information that is contextually relevant to the device user;
    responsively to the wake-up alarm going off, generating a summary of the contextually relevant information; and
    surfacing the generated summary of the contextually relevant information.

2. The method of claim 1, further including comprising monitoring an occurrence of an event, wherein the wake-up alarm is set to occur at a time or in response to the occurrence of the event.

3. The method of claim 1, wherein the contextual data comprises at least one of a time/date, location of the user or device, language, schedule, applications installed on the device, user preferences, user behaviors, user activities, stored contacts, call history, messaging history, browsing history, device type, device capabilities, and communication network type.

4. The method of claim 1, further comprising verbally reading out the summary or displaying the summary on the device another device that is operatively coupled to the device.

5. The method of claim 1, further comprising monitoring the device user's behaviors over a time interval.

6. The method of claim 1, further including comprising:
selecting, based on the contextual data, a sound, music or lighting;
rendering the selected sound, music or lighting.

7. The method of claim 1, wherein the device is connected via a network to a remote device including a user interface.

8. The method of claim 1, further comprising interacting with the device user via the user interface of the remote device.

9. The method of claim 1, further comprising pre-fetching, for the device user to review after waking-up, data comprising third-party content unassociated with the device or device user.

10. The method of claim 1, further comprising performing, in response to a user input from the device user, at least one of
sharing contact information;
sharing a stored contact
scheduling a meeting, looking at a user's calendar
scheduling a reminder, making a call
operating a device, playing games
making purchases, taking notes
scheduling an alarm or wake-up reminder
sending a message
checking social media for updates
scraping a website
interacting with a search service
sharing or showing files
sending a link to a website; and
sending a link to a resource.

11. A device for providing a catered wake-up experience, comprising:
a processor; and
a memory in communication with the processor, the memory comprising executable instructions that, when executed by the processor, cause the processor to control the device to perform functions of:
setting a wake-up alarm in response to received instructions;
obtaining contextual data pertaining to a device user;
inferring a new wake-up setting for the device user through a combination of heuristics, pattern recognition methods, learning-algorithms and/or policies that take into account available inputs, contexts and the device user's behaviors and interactions;
interacting with the device user to confirm the new wake-up setting, the interacting with the device user including asking a clarifying question and receiving the device user's answer to the clarifying question;
automatically collaborating with a plurality of applications that are distinct from the wake-up alarm, wherein the collaborating includes identifying incoming notifications for the applications that are unique to the respective applications, the device receiving the incoming notifications while the device is not in use;
automatically extracting contents from the incoming notifications that are dynamic, personal, and unique to the device user;
using the contextual data pertaining to the device user, determining a contextual relevancy of the content of each incoming notification to the device user;
selecting, based on the determined contextual relevancy, portions of the contents of the incoming notifications to generate information that is contextually relevant to the device user;
responsively to the wake-up alarm going off, generating a summary of the contextually relevant information; and
surfacing the generated summary of the contextually relevant information.

12. The device of claim 11, wherein the instructions, when executed by the processor, further cause the processor to control the device to perform a function of monitoring an occurrence of an event, wherein the wake-up alarm is set to occur at a time or in response to the occurrence of the event.

13. The device of claim 11, wherein the contextual data comprises at least one of a time/date, location of the user or device, language, schedule, applications installed on the device, user preferences, user behaviors, user activities, stored contacts, call history, messaging history, browsing history, device type, device capabilities, and communication network type.

14. The device of claim 11, wherein the instructions, when executed by the processor, further cause the processor to control the device to perform a function of verbally reading out the summary or displaying the summary on the device or another device that is operatively coupled to the device.

15. The device of claim 11, wherein the instructions, when executed by the processor, further cause the processor to control the device to perform a function of monitoring the device user's user behaviors over a time interval.

16. The device of claim 11, wherein the instructions, when executed by the processor, further cause the processor to control the device to perform functions of:
selecting, based on the contextual data, a sound, music or lighting;
rendering the selected sound, music or lighting.

17. The device of claim 11, wherein the device is connected via a network to a remote device including a user interface.

18. The device of claim 17, wherein the instructions, when executed by the processor, further cause the processor to control the device to perform a function of interacting with the device user via the user interface of the remote device.

19. The device of claim 11, wherein the instructions, when executed by the processor, further cause the processor to control the device to perform a function of pre-fetching, for the device user to review after waking-up, data comprising third-party content unassociated with the device or device user.

20. A non-transitory computer readable medium containing instructions which, when executed by a processor, cause a device to perform functions of:
setting a wake-up alarm in response to a received instruction;
obtaining contextual data pertaining to a device user;
inferring a new wake-up setting for the device user through a combination of heuristics, pattern recognition methods, learning-algorithms and/or policies that take into account available inputs, contexts and the device user's behaviors and interactions;
interacting with the device user to confirm the new wake-up setting, the interacting with the device user including asking a clarifying question and receiving the device user's answer to the clarifying question;
automatically collaborating with a plurality of applications that are distinct from the wake-up alarm, wherein the collaborating includes identifying incoming notifications for the applications that are unique to the respective applications, the device receiving the incoming notifications while the device is not in use;
automatically extracting contents from the incoming notifications that are dynamic, personal, and unique to the device user;
using the contextual data pertaining to the device user, determining a contextual relevancy of the content of each incoming notification to the device user;
selecting, based on the determined contextual relevancy, portions of the contents of the incoming notifications to generate information that is contextually relevant to the device user;
responsively to the wake-up alarm going off, generating a summary of the contextually relevant information; and
surfacing the generated summary of the contextually relevant information.

* * * * *